(12) United States Patent
Kimura et al.

(10) Patent No.: US 11,348,545 B2
(45) Date of Patent: May 31, 2022

(54) IMAGE PROCESSING DEVICE, DISPLAY DEVICE, AND IMAGE PROCESSING METHOD

(71) Applicant: SONY CORPORATION, Tokyo (JP)

(72) Inventors: Hiroaki Kimura, Tokyo (JP);
Harunobu Kamei, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/045,899

(22) PCT Filed: Mar. 22, 2019

(86) PCT No.: PCT/JP2019/012182
§ 371 (c)(1),
(2) Date: Oct. 7, 2020

(87) PCT Pub. No.: WO2019/225137
PCT Pub. Date: Nov. 28, 2019

(65) Prior Publication Data
US 2021/0142745 A1    May 13, 2021

(30) Foreign Application Priority Data

May 22, 2018 (JP) .............................. JP2018-097954

(51) Int. Cl.
*G09G 3/36* (2006.01)
(52) U.S. Cl.
CPC ... *G09G 3/3607* (2013.01); *G09G 2320/0276* (2013.01)
(58) Field of Classification Search
None
See application file for complete search history.

(56) References Cited

U.S. PATENT DOCUMENTS

2003/0030654 A1   2/2003  Sagano
2005/0184952 A1   8/2005  Konno et al.
(Continued)

FOREIGN PATENT DOCUMENTS

CN   1396767 A   2/2003
CN   1652587 A   8/2005
(Continued)

OTHER PUBLICATIONS

International Search Report dated Jun. 18, 2019 in PCT/JP2019/012182, 2 pages.

*Primary Examiner* — Ifedayo B Iluyomade
(74) *Attorney, Agent, or Firm* — Oblon, McClelland, Maier & Neustadt, L.L.P.

(57) ABSTRACT

Image quality degradation in a display device with two liquid crystal cells is reduced. For this purpose, as an image signal for a liquid crystal display panel in which a display image is generated by light passing through a rear liquid crystal cell and a front liquid crystal cell, an image processing unit generates a rear image signal for the rear liquid crystal cell and a rear image signal for the front liquid crystal cell.
This image processing unit includes a gradation value conversion unit that performs a gradation value conversion on an input image signal so as to generate a rear image signal for the rear liquid crystal cell, and a limit processing unit that performs a process of limiting a value of the rear image signal output from the gradation value conversion unit to a predetermined limit value.

14 Claims, 17 Drawing Sheets

(56) References Cited

U.S. PATENT DOCUMENTS

| | | |
|---|---|---|
| 2005/0184981 A1 | 8/2005 | Aoki |
| 2006/0038740 A1 | 2/2006 | Jung et al. |
| 2006/0238487 A1 | 10/2006 | Shih |
| 2010/0118006 A1 | 5/2010 | Kimura |
| 2012/0057084 A1 | 3/2012 | Sano et al. |
| 2015/0332636 A1 | 11/2015 | Watanabe et al. |
| 2016/0180761 A1 | 6/2016 | Sasaki |
| 2016/0180782 A1* | 6/2016 | Nakaya ................ G09G 3/3648 345/690 |
| 2016/0379575 A1 | 12/2016 | Kawai et al. |
| 2017/0343839 A1 | 11/2017 | Nam et al. |

FOREIGN PATENT DOCUMENTS

| | | |
|---|---|---|
| CN | 101202023 A | 6/2008 |
| CN | 101739987 A | 6/2010 |
| CN | 101751893 A | 6/2010 |
| CN | 102007528 A | 4/2011 |
| CN | 102930831 A | 2/2013 |
| CN | 105719608 A | 6/2016 |
| CN | 107450203 A | 12/2017 |
| EP | 1927974 A2 | 6/2008 |
| JP | 2010-113269 A | 5/2010 |
| JP | 2013020269 A | 1/2013 |
| JP | 2016-1186850 A | 6/2016 |
| JP | 2017-15768 A | 1/2017 |
| WO | WO 2016/063675 A1 | 4/2016 |
| WO | WO-2016063675 A1 * | 4/2016 ............... G06T 5/00 |

\* cited by examiner

FIG. 2
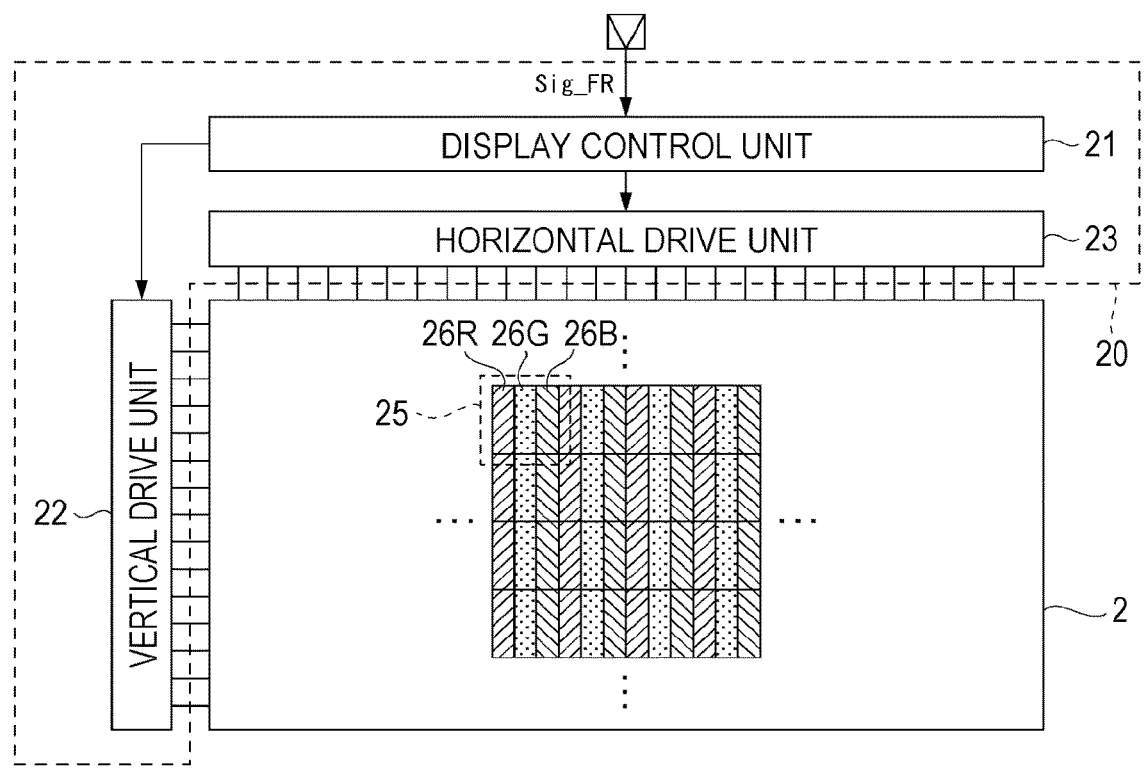
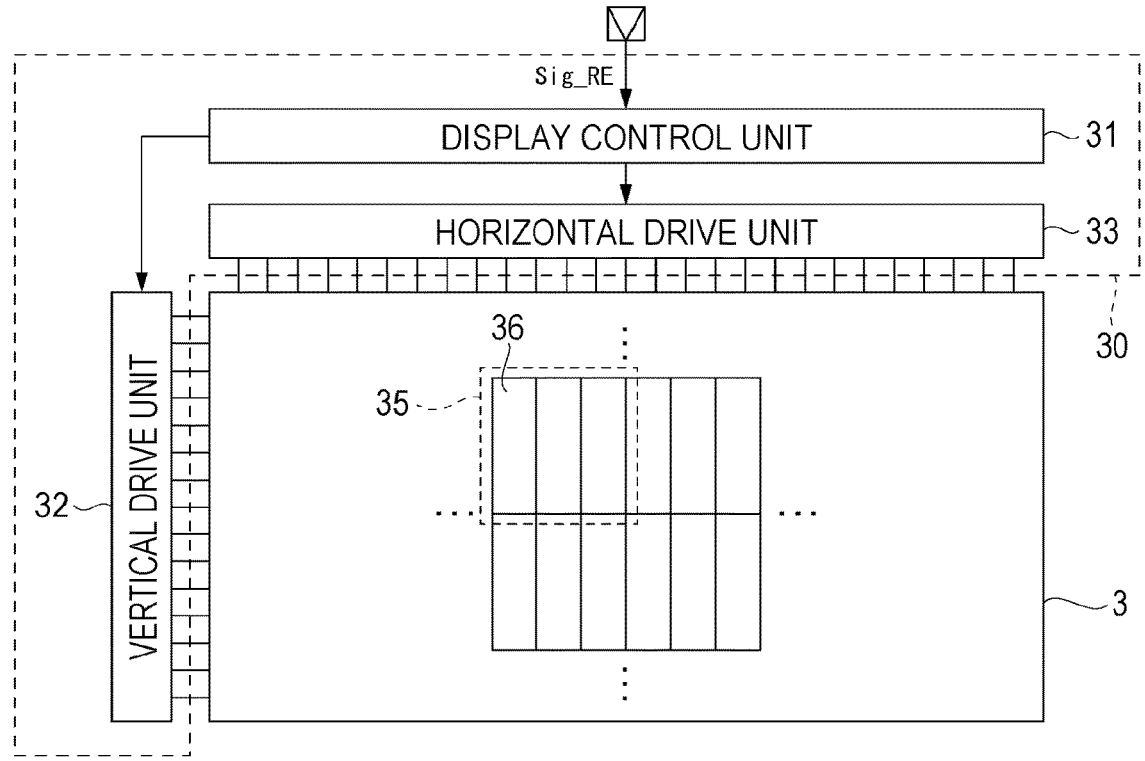

FIG. 6
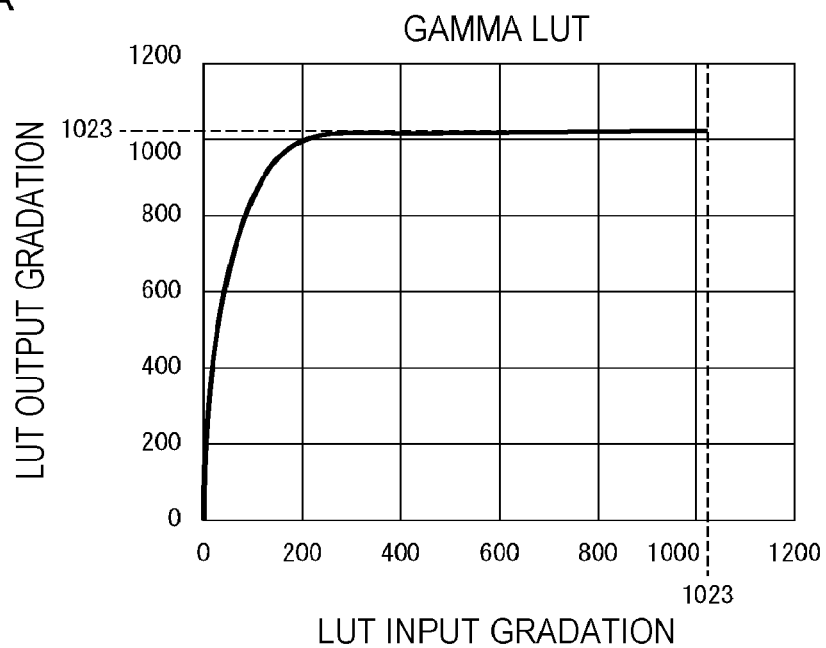
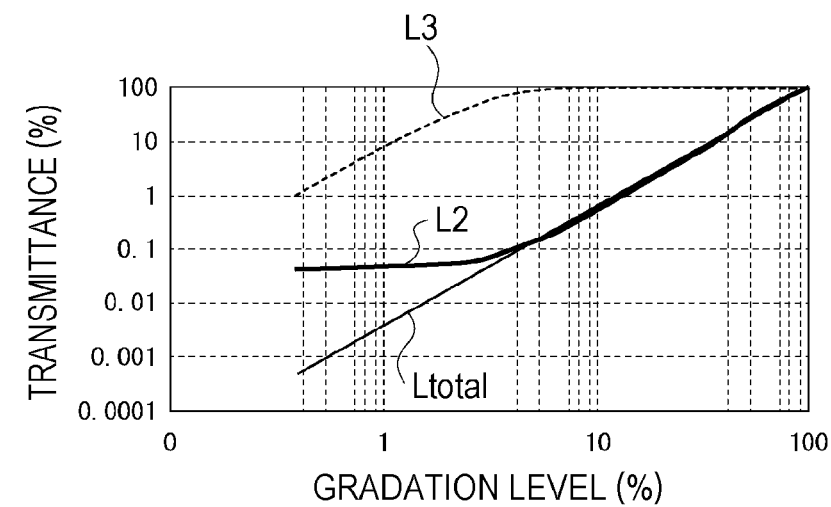

FIG. 8
A
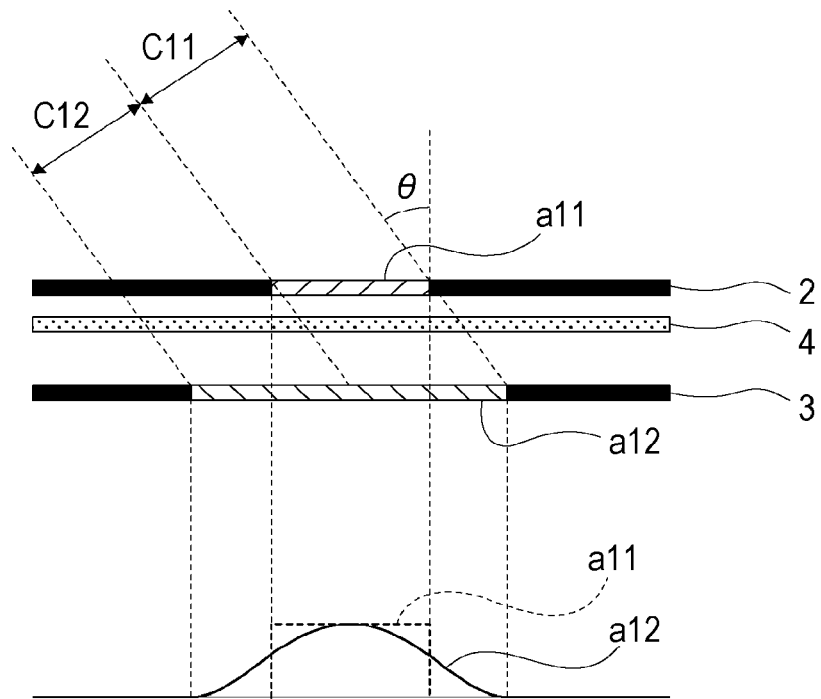
B
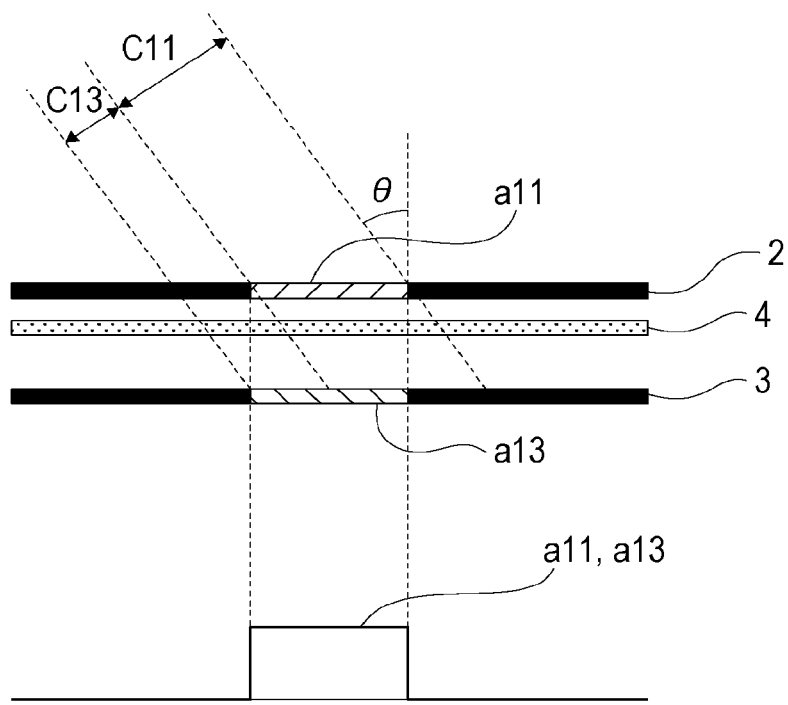

FIG. 10
A   INPUT WAVEFORM
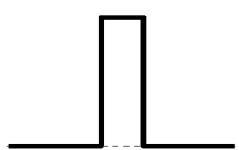 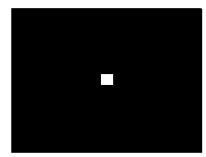
B
REAR WAVEFORM
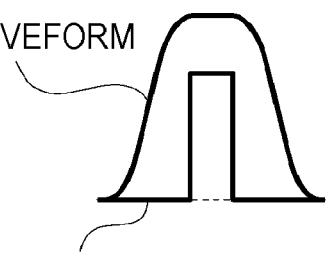 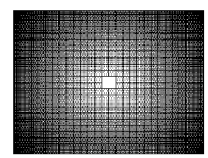
FRONT WAVEFORM
C
REAR WAVEFORM
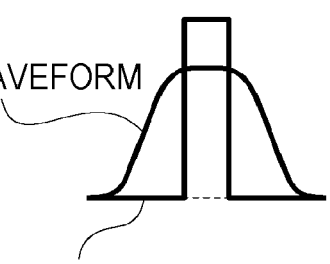 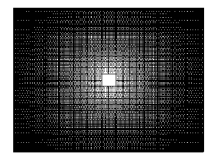
FRONT WAVEFORM FIG. 12
A
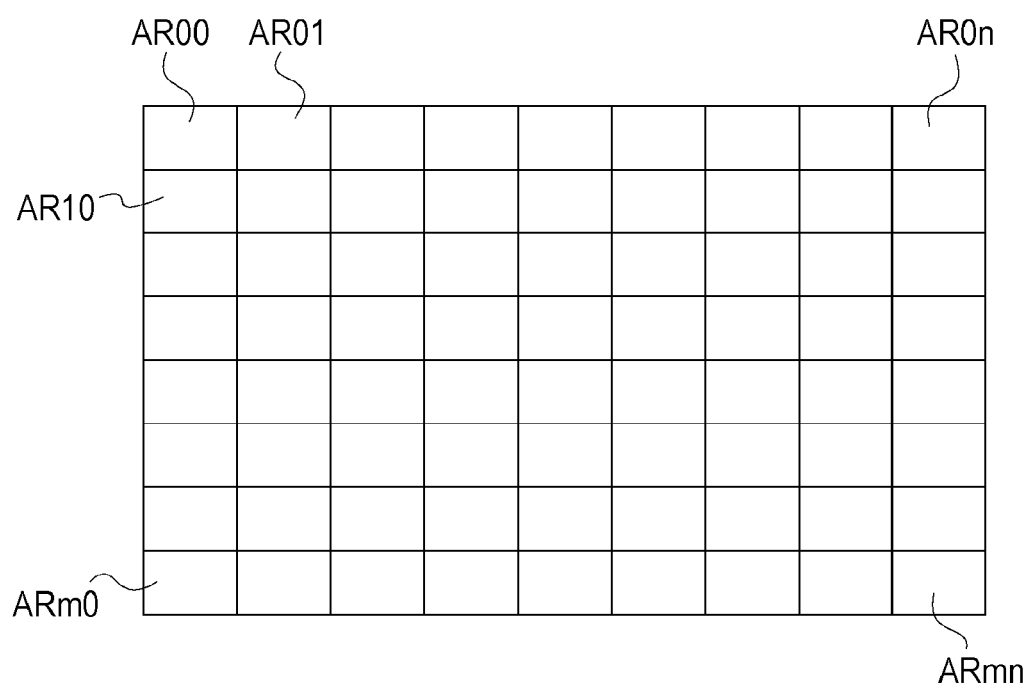
B
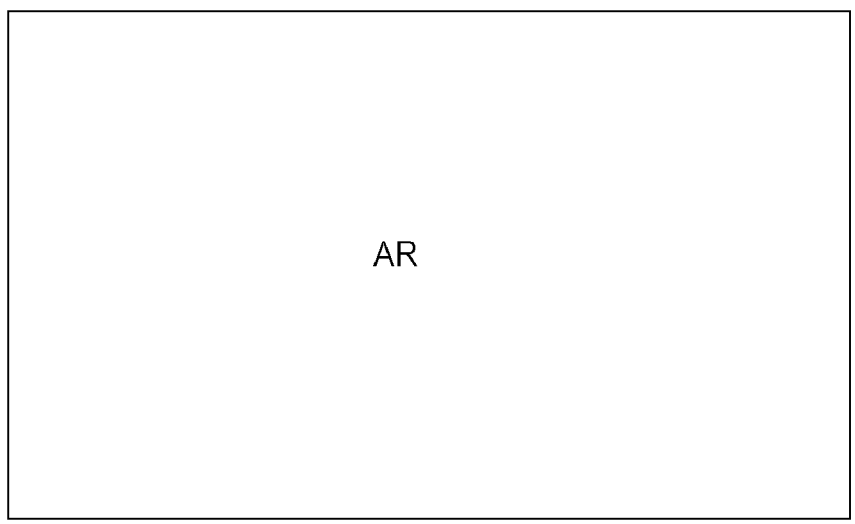

IMAGE PROCESSING DEVICE, DISPLAY DEVICE, AND IMAGE PROCESSING METHOD

TECHNICAL FIELD

The present technology relates to an image processing device, a display device, and an image processing method, and more particularly relates to processing an image signal for a display panel in which a display image is generated by light passing through a rear liquid crystal cell and a front liquid crystal cell.

BACKGROUND ART

Various structures are known as liquid crystal display devices. Patent Document 1 below discloses a dual liquid crystal cell type liquid crystal display device as one of the structures.

CITATION LIST

Patent Document

Patent Document 1: WO 2016/063675 Pamphlet

SUMMARY OF THE INVENTION

Problems to be Solved by the Invention

In a dual liquid crystal cell type display device, a problem occurs that display images of two liquid crystals appear doubled due to parallax when observed from an angle.

Therefore, for example, a signal input to a rear liquid crystal cell is subjected to gamma conversion into a gamma value of one or less, to thereby saturate the rear liquid crystal cell to 100% transmittance at a certain gradation or higher, or a filter process for expanding in a plane direction is performed on the signal input to the rear liquid crystal cell, so as to reduce the image shift due to parallax.

However, for example, when a signal of a small area like a white spot is displayed on a black background, although the white spot displayed on the rear liquid crystal cell spreads due to the filter process described above, an image displayed on the rear liquid crystal cell may be seen through due to leaked light from a front liquid crystal cell, and surroundings of the white spot may appear to shine lightly, resulting in reduced image quality.

Further, when the spread white spot on the rear liquid crystal cell side becomes brighter by the gamma conversion process, the leaked light increases and the image quality further deteriorates.

Accordingly, it is an object of the present technology to reduce these image quality deteriorations in a case where a dual liquid crystal cell type display device is used.

Solutions to Problems

An image processing device according to an embodiment of the present technology includes a gradation value conversion unit that performs a gradation value conversion on an input image signal, which is an image signal for a display panel in which a display image is generated by light passing through a rear liquid crystal cell and a front liquid crystal cell, so as to generate a rear image signal for the rear liquid crystal cell, and a limit processing unit that performs a process of limiting a value of the rear image signal output from the gradation value conversion unit to a limit value.

The image signal to be processed by the image processing device is an image signal used in a dual liquid crystal cell type liquid crystal display panel. The image processing device processes an image signal for each of a front liquid crystal cell and a rear liquid crystal cell of a dual liquid crystal cell type liquid crystal display panel. In this case, the limit process is performed on the rear image signal generated by the gradation value conversion.

In the image processing device according to the present technology described above, it is conceivable to include a maximum value detection unit that detects a maximum value of the input image signal, in which the limit processing unit sets the limit value to a value based on the maximum value detected by the maximum value detection unit.

That is, the maximum value of the input image signal is detected, and a value that changes as a value based on the maximum value is used as the limit value.

In the image processing device according to the present technology described above, it is conceivable that the limit processing unit sets the maximum value detected by the maximum value detection unit as the limit value.

That is, the maximum value of the input signal is directly used as the limit value.

In the image processing device according to the present technology described above, it is conceivable that the maximum value detection unit detects the maximum value for every area of a plurality of areas set in the image, and the limit processing unit performs, for every area, a limit process with a limit value based on a maximum value in the area.

That is, the image area of one frame is divided and set into a plurality of areas. Then, the maximum value of the input signal is detected for every area, and the limit process of the rear image signal is performed, for every area, with the limit value based on the maximum value.

In the image processing device according to the present technology described above, it is conceivable to include a lower limit processing unit that outputs, if the maximum value detected by the maximum value detection unit is less than a lower limit value that is set, the lower limit value as the maximum value.

That is, if the detected maximum value is larger than or equal to the set lower limit value, the detected maximum value is output as it is, but if the detected maximum value is less than the lower limit value, the detected maximum value is output instead of the lower limit value.

In the image processing device according to the present technology described above, it is conceivable to include a time filter unit that suppresses a variation amount in a time axis direction of the maximum value detected by the maximum value detection unit.

For example, the variation amount is suppressed so that the maximum value of the current frame of the input image signal and the maximum value of the previous frame (in a case of dividing into areas, the maximum value of a certain area of the current frame and the maximum value of the corresponding area of all frames) do not change rapidly.

In the image processing device according to the present technology described above, it is conceivable to include a scene change detection unit that detects a scene change for the input image signal, in which the time filter unit changes a filter operation if a scene change is detected.

For example, the scene change detection unit detects whether or not a scene as an image content has changed by comparing the current frame and the previous frame. The time filter unit switches the filter characteristic or switches on and off of the filter process in response to detection of a scene change.

In the image processing device according to the present technology described above, it is conceivable that a lower limit processing unit that sets, if the maximum value detected by the maximum value detection unit is less than a lower limit value that is set, the maximum value as the lower limit value, and a moving image detection unit that detects whether or not the input image signal is a moving image, in which the lower limit processing unit sets the lower limit value to a different value between when the input image signal is a moving image and when the input image signal is not a moving image.

For example, the lower limit value in the lower limit process is set to be different between when the input image signal is a moving image and when the input image signal is a still image.

In the image processing device according to the present technology described above, it is conceivable to include a spatial filter unit that suppresses a variation amount in a spatial direction of the maximum value in every area of a plurality of areas set in an image.

That is, with respect to the maximum value in each area, the filter process is performed so as not to cause a rapid change in a spatial direction (image plane direction in which a plurality of areas is adjacent to each other).

In the image processing device according to the present technology described above, it is conceivable that the gradation value conversion unit performs gamma conversion with a gamma value smaller than one.

The gamma conversion with a gamma value smaller than one is performed in order to perform good gradation expression in a state that the front image and the rear image are combined. In this case, a limit process is performed.

In the image processing device according to the present technology described above, it is conceivable to include a spatial processing unit that performs on the rear image signal a spatial filter process to make a transmission pixel range of an image in the rear liquid crystal cell larger than that of an image in the front liquid crystal cell.

That is, the spatial filter process is performed so as to blur the rear image. Specifically, a process like a low-pass filter for the rear image signal is performed so that the range of transmitting pixels on the rear liquid crystal cell side is enlarged to blur the image with respect to the image of the front liquid crystal cell by the front image signal.

In the image processing device according to the present technology described above, it is conceivable to include a front image generation unit that performs a calculation process using the rear image signal on the input image signal to generate a front image signal for the front liquid crystal cell, in which the input image signal is a color image signal, the gradation value conversion unit performs gradation value conversion on a monochrome image signal converted from the color image signal, and the front image generation unit generates the front image signal by dividing the input image signal that is a color image signal by the rear image signal processed by the limit processing unit.

That is, each of gradation values of, for example, R, G, and B as an image signal that is a color image signal is divided by the gradation value of the rear image signal after the limit process, so as to obtain the gradation values of R, G, and B as the front image signal.

A display device according to an embodiment of the present technology includes a display panel in which a display image is generated by light passing through a rear liquid crystal cell and a front liquid crystal cell, a gradation value conversion unit that performs a gradation value conversion on an input image signal, which is an image signal for the display panel, so as to generate a rear image signal for the rear liquid crystal cell, a limit processing unit that performs a process of limiting the value of the rear image signal output from the gradation value conversion unit to a predetermined limit value, and a front image generation unit that performs a calculation process using the rear image signal on the input image signal to generate a front image signal for the front liquid crystal cell.

In this display device, the display panel includes, for example, a light source unit, a rear liquid crystal cell, a diffusion layer, and a front liquid crystal cell, which are arranged in this order to form what is called a dual liquid crystal cell type liquid crystal display panel. A limit process is performed on the rear image signal for such a dual liquid crystal cell type liquid crystal display panel.

An image processing method according to the present technology is to perform a gradation value conversion and a process of limiting to a limit value in the image processing device described above.

Effects of the Invention

According to the present technology, in a dual liquid crystal cell type display device, light leakage generated around an isolated white spot is reduced by lowering a signal level of a rear liquid crystal cell, and by the reduction in the light leakage, a double image seen from an angle is improved, thereby obtaining an image quality improving effect.

Note that the effects described here are not necessarily limited, and may be any effect described in the present disclosure.

BRIEF DESCRIPTION OF DRAWINGS

FIG. 2 is an explanatory diagram of a front liquid crystal cell and a rear liquid crystal cell of the embodiment.

FIG. 6 is an explanatory diagram of a gamma process of the embodiment.

FIG. 8 is an explanatory diagram of a state visually observed from an oblique direction in each case with or without the spatial filter process.

FIG. 10 is an explanatory diagram of suppressing light leakage around a white spot of the embodiment.

FIG. 12 is an explanatory diagram of area setting in maximum value detection of the embodiment.

MODE FOR CARRYING OUT THE INVENTION

Hereinafter, an embodiment will be described in the following order.
<1. Configuration of display device>
<2. First embodiment>
<3. Second embodiment>
<4. Third embodiment>
<5. Fourth embodiment>
<5. Fifth embodiment>
<3. Sixth embodiment>
<7. Summary and modification example>

For the sake of explanation, three primary colors, red, green, and blue, will be described as R, G, and B in alphabet, respectively.

<1. Configuration of Display Device>

Figure 1:
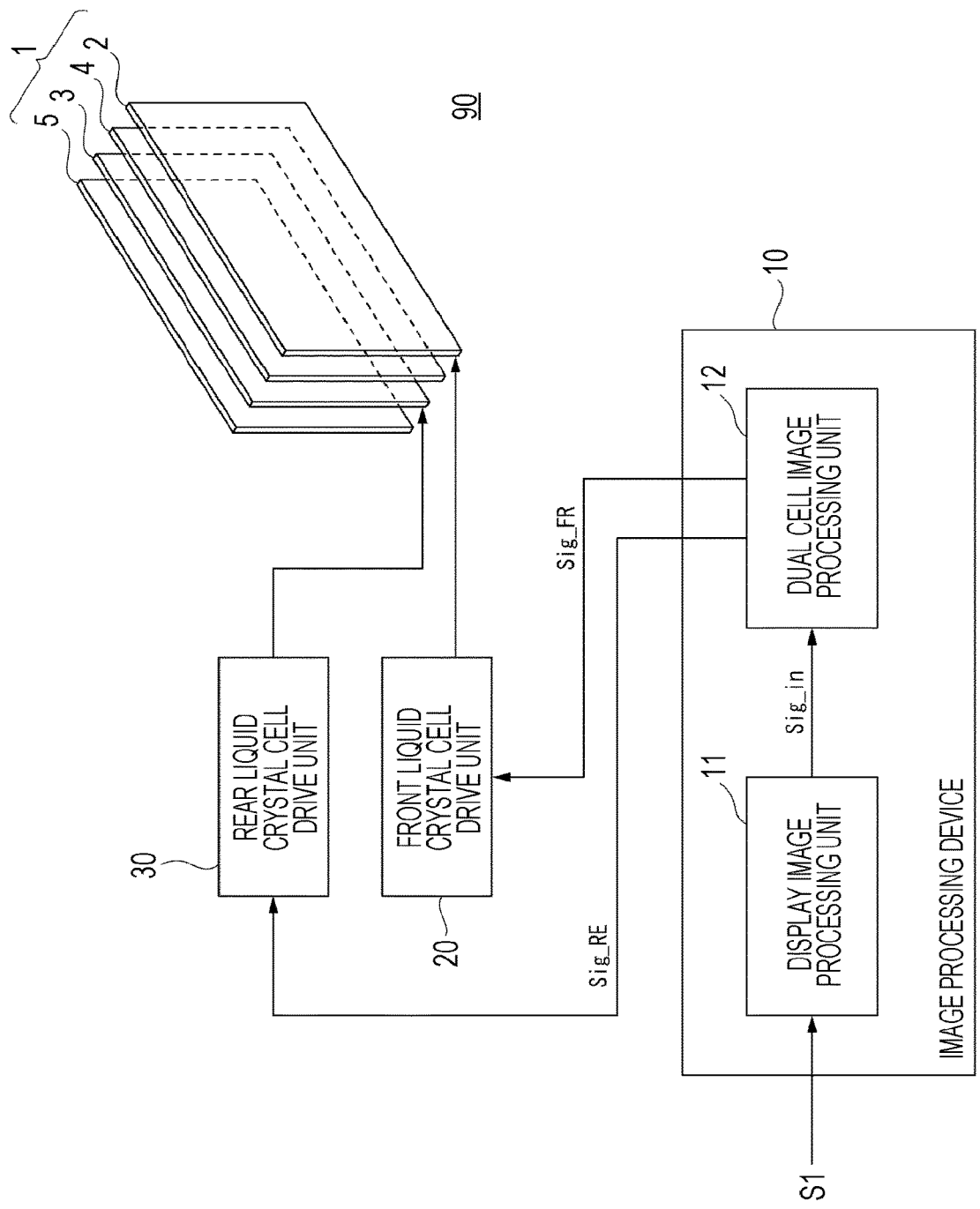
FIG. 1 is a block diagram of a display device of an embodiment of the present technology.

FIG. 1 illustrates a configuration of a display device 90 of the embodiment. The display device 90 has a liquid crystal display panel 1, an image processing device 10, a front liquid crystal cell drive unit 20, and a rear liquid crystal cell drive unit 30.

The liquid crystal display panel 1 is a dual cell type liquid crystal display panel and includes a front liquid crystal cell 2, a diffusion layer 4, a rear liquid crystal cell 3, and a backlight 5.

On a front side of the backlight 5, the rear liquid crystal cell 3, the diffusion layer 4, and the front liquid crystal cell 2 are arranged to be stacked in this order, and a viewer sees an image displayed from a front side of the front liquid crystal cell 2.

Each of the front liquid crystal cell 2 and the rear liquid crystal cell 3 forms one liquid crystal display panel, but in the present embodiment, the entire dual liquid crystal cell type display panel is referred to as a liquid crystal display panel 1.

The image processing device 10 performs signal processing for displaying on the liquid crystal display panel 1 with respect to an image signal S1 input as a color image signal (for example, a signal of ultra high definition (UHD) format, and the like).

The image processing device 10 has a display image processing unit 11 and a dual cell image processing unit 12.

The display image processing unit 11 performs necessary decoding processing, luminance processing, color processing, resolution conversion, or the like on the input image signal S1, and supplies a processed image signal Sig_in to the dual cell image processing unit 12. At least at the stage of the image signal Sig_in, it is a color image signal indicating a gradation value of each color of R, G, and B.

The dual cell image processing unit 12, which will be described in detail later, performs processing corresponding to the dual cell type liquid crystal display panel 1.

That is, the dual cell image processing unit 12 performs signal processing on the input image signal Sig_in to generate and output an image signal for the front liquid crystal cell 2 (front image signal Sig_FR) and an image signal for the rear liquid crystal cell 3 (rear image signal Sig_RE).

The front image signal Sig_FR is a color image signal including R, G, and B gradation values. On the other hand, the rear image signal Sig_RE is a black and white (grayscale) image signal including grayscale gradation values.

The front image signal Sig_FR output from the image processing device 10 is supplied to the front liquid crystal cell drive unit 20. The front liquid crystal cell drive unit 20 drives the front liquid crystal cell 2 on the basis of the front image signal Sig_FR to execute color image display.

The rear image signal Sig_RE output from the image processing device 10 is supplied to the rear liquid crystal cell drive unit 30. The rear liquid crystal cell drive unit 30 drives the rear liquid crystal cell 3 on the basis of the rear image signal Sig_RE to execute monochrome image display.

An example of structures of the front liquid crystal cell drive unit 20 and the front liquid crystal cell 2 is illustrated in FIG. 2A.

The front liquid crystal cell drive unit 20 has a display control unit 21, a vertical drive unit 22, and a horizontal drive unit 23, and drives the front liquid crystal cell 2 with these configurations.

The display control unit 21 supplies a control signal to the vertical drive unit 22 and also supplies image signals (signals according to the gradation values of R, G, and B) and a control signal to the horizontal drive unit 23 on the basis of the front image signal Sig_FR, so as to control them to operate in synchronization with each other.

The vertical drive unit 22 sequentially selects one horizontal line to be a target of display drive in the front liquid crystal cell 2 on the basis of the control signal supplied from the display control unit 21.

The horizontal drive unit 23 generates a pixel voltage for one horizontal line on the basis of the image signal and the control signal supplied from the display control unit 21, and supplies the pixel voltage to sub-pixels 26 (26R, 26G, and 26B) for one horizontal line selected by the vertical drive unit 22.

The front liquid crystal cell 2 has a plurality of pixels 25 arranged in a matrix.

Each pixel 25 has three sub-pixels 26R, 26G, and 26B.

The sub-pixel 26R has a red color filter, the sub-pixel 26G has a green color filter, and the sub-pixel 26B has a blue color filter.

Pixel voltages are supplied to these sub-pixels 26R, 26G, and 26B from the horizontal drive unit 23, respectively. Then, the sub-pixels 26R, 26G, and 26B are configured to change light transmittance according to the pixel voltages.

An example of structures of the rear liquid crystal cell drive unit 30 and the rear liquid crystal cell 3 are illustrated in FIG. 2B.

The rear liquid crystal cell drive unit 30 has a display control unit 31, a vertical drive unit 32, and a horizontal drive unit 33, and drives the rear liquid crystal cell 3 with these configurations.

The display control unit 31 supplies a control signal to the vertical drive unit 32 and also supplies image signals (signals according to the gradation values as grayscales) and a control signal to the horizontal drive unit 33 on the basis of the rear image signal Sig_RE, so as to control them to operate in synchronization with each other.

The vertical drive unit 32 sequentially selects one horizontal line to be a target of display drive in the front liquid crystal cell 2 on the basis of the control signal supplied from the display control unit 31.

The horizontal drive unit 33 generates a pixel voltage for one horizontal line on the basis of the image signal and the control signal supplied from the display control unit 31, and supplies the pixel voltage to the sub-pixels 36 for one horizontal line selected by the vertical drive unit 32.

A plurality of pixels 35 is arranged in a matrix in the rear liquid crystal cell 3.

Each pixel 35 has three sub-pixels 36. Each sub-pixel 36 does not have a color filter. That is, each sub-pixel 26R, 26G, or 26B in the front liquid crystal cell 2 has a color filter of a corresponding color, but each sub-pixel 36 in the rear liquid crystal cell 3 does not have a color filter.

The same pixel voltage is supplied from the horizontal drive unit 33 to the three sub-pixels 36 belonging to one pixel 35. Then, the sub-pixels 36 are configured to change light transmittance according to the pixel voltage.

Note that the pixels 35 of the rear liquid crystal cell 3 may be configured such that a set of the three sub-pixels described above is configured as one electrode and as one pixel of a black matrix. That is, it may be not only a color filter-less but also a structure with no sub-pixels in respective liquid crystal structure elements such as a TFT, a transparent electrode, a wiring, and a black matrix. In that case, one pixel 35 corresponds to the three sub-pixels 26R, 26G, and 26B in the front liquid crystal cell 2.

Such a rear liquid crystal cell 3 can be manufactured by omitting the step of forming a color filter in the manufacturing process of a general-purpose liquid crystal display panel capable of displaying a color image. Therefore, in the display device 90, development cost and manufacturing cost can be reduced as compared with a case where a dedicated product is developed.

The backlight 5 illustrated in FIG. 1 emits light on the basis of a backlight control signal (not illustrated). The backlight 5 is arranged on a back side of the rear liquid crystal cell 3.

The backlight 5 includes a light emitting unit formed by, for example, an LED (Light Emitting Diode) to emit light.

Figure 3:
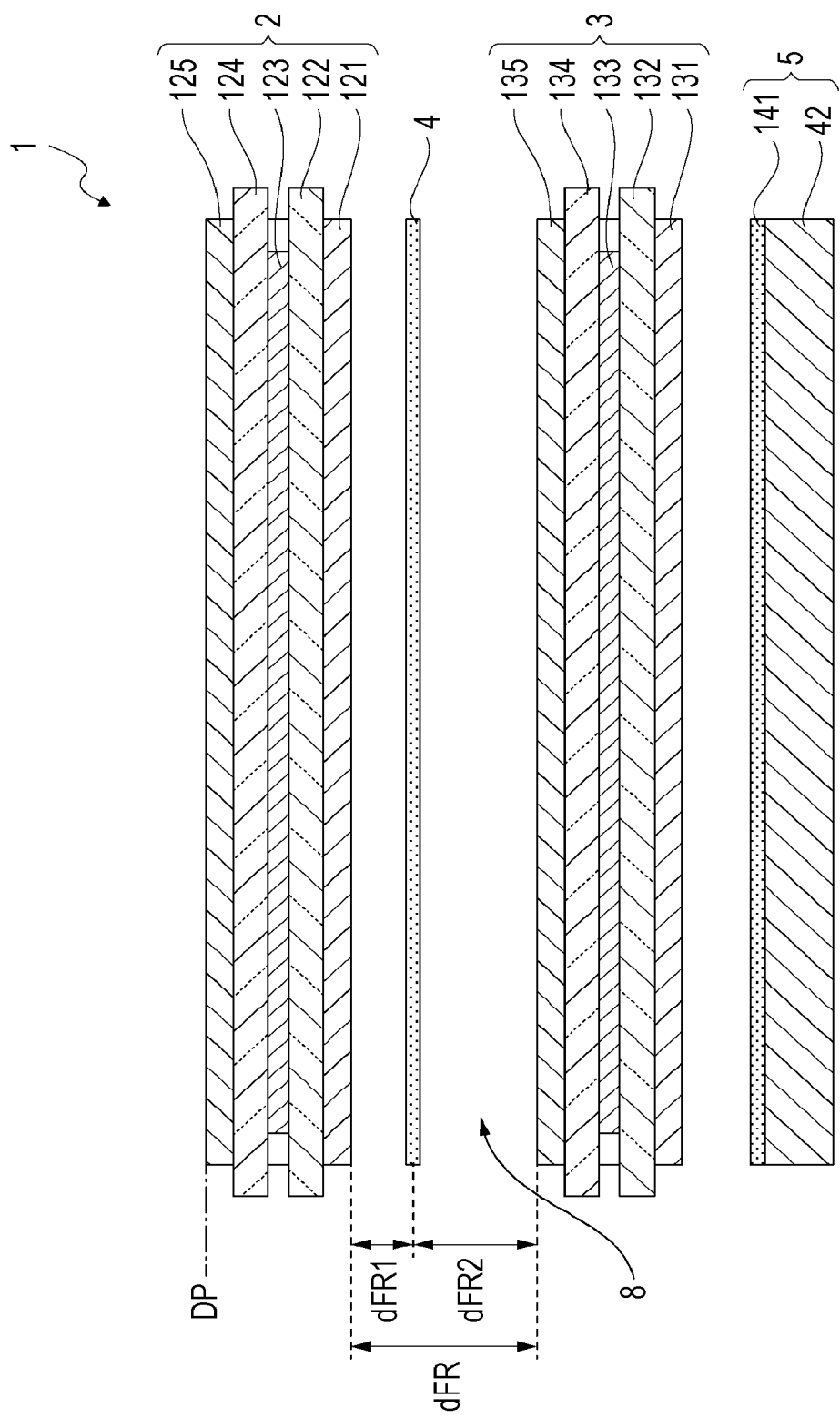
FIG. 3 is an explanatory diagram of an arrangement of a liquid crystal display panel of the embodiment.

FIG. 3 illustrates an arrangement configuration of the liquid crystal display panel 1.

As illustrated in the diagram, in the liquid crystal display panel 1, the backlight 5, the rear liquid crystal cell 3, the diffusion layer 4, and the front liquid crystal cell 2 are arranged in this order, and an upper surface of the front liquid crystal cell 2 in FIG. 3 is a display plane DP.

That is, light emitted from the backlight 5 passes through the backlight 5, the rear liquid crystal cell 3, the diffusion layer 4, and the front liquid crystal cell 2 so as to reach the viewer.

The front liquid crystal cell 2 and the rear liquid crystal cell 3 are arranged apart from each other. Then, a diffusion layer 4 is arranged in a gap 8 between the front liquid crystal cell 2 and the rear liquid crystal cell 3.

Note that as a configuration example, the cells of the front liquid crystal cell 2 and the rear liquid crystal cell 3 may be adhered to each other with an adhesive layer without a gap.

The front liquid crystal cell 2 has substrates 122 and 124, a liquid crystal layer 123, and polarizing plates 121 and 125.

The substrates 122 and 124 are formed with, for example, glass substrates, and are arranged so as to face each other.

A pixel electrode is formed for every sub-pixel 26 on a surface of the substrate 122 on the substrate 124 side, and a pixel voltage is applied by the horizontal drive unit 23 described above.

An electrode common to each of the sub-pixels 26 is formed on a surface of the substrate 124 on the substrate 122 side. Further, a color filter and a black matrix are formed on the substrate 124.

The liquid crystal layer 123 is sealed between the substrate 122 and the substrate 124, and has light transmittance that changes according to the pixel voltage applied to the pixel electrode of the substrate 122.

The polarizing plate 121 is attached to a light incident side of the substrate 122, and the polarizing plate 125 is attached to a light emitting side of the substrate 124. A transmission axis of the polarizing plate 121 and a transmission axis of the polarizing plate 125 intersect each other.

The rear liquid crystal cell 3 has substrates 132 and 134, a liquid crystal layer 133, and polarizing plates 131 and 135.

The substrates 132 and 134 are formed with, for example, glass substrates, and are arranged so as to face each other.

A pixel electrode is formed for every sub-pixel 26 on a surface of the substrate 132 on the substrate 134 side, and a pixel voltage is applied by the horizontal drive unit 33 described above.

Note that a structure having no sub-pixel as described above is also conceivable, and in this case, the pixel electrode is formed for every pixel 35.

An electrode common to each of the sub-pixels 36 is formed on the surface of the substrate 134 on the substrate 132 side. Further, a black matrix is formed on the substrate 134. Then, unlike the substrate 124 of the front liquid crystal cell 2, the substrate 134 has no color filter formed thereon.

The liquid crystal layer 133 is sealed between the substrate 132 and the substrate 134, and has transmittance of light that changes according to the pixel voltage applied to the pixel electrode of the substrate 132.

The polarizing plate 131 is attached to a light incident side of the substrate 132, and the polarizing plate 135 is attached to a light emitting side of the substrate 134. A transmission axis of the polarizing plate 131 and a transmission axis of the polarizing plate 135 intersect each other.

The diffusion layer 4 diffuses light incident from the rear liquid crystal cell 3 side. For the diffusion layer 4, for example, a diffusion film in which beads are randomly dispersed on or in a resin film can be used.

This diffusion layer 4 is for reducing moire in a display image. That is, in the liquid crystal display panel 1, since the front liquid crystal cell 2 and the rear liquid crystal cell 3, which are two liquid crystal display panels, are arranged so as to overlap with each other, moire may occur in the displayed image. Therefore, in the liquid crystal display panel 1, the diffusion layer 4 is arranged between the front liquid crystal cell 2 and the rear liquid crystal cell 3 to reduce the moire and suppress deterioration in image quality.

Although the diffusion layer 4 may be arranged at any position in the gap 8, it is desirably arranged on a side closer to the front liquid crystal cell 2 as illustrated in FIG. 3. That is, out of inter-panel distances dFR, a distance dFR1 between the diffusion layer 4 and the front liquid crystal cell 2 is desirably smaller than a distance dFR2 between the diffusion layer 4 and the rear liquid crystal cell 3 (dFR1<dFR2).

In this case, a transparent material layer may be formed in one or both of between the diffusion layer 4 and the front liquid crystal cell 2 and between the diffusion layer 4 and the rear liquid crystal cell 3.

Further, it is more desirable to dispose the diffusion layer 4 so as to be adjacent to the front liquid crystal cell 2 (dFR1=0). This is because the closer the diffusion layer 4 is to the front liquid crystal cell 2, the more effectively the moire can be suppressed and also the sharpness can be increased.

The higher the degree of diffusion (haze value) of the diffusion layer 4, the more effectively the moire can be suppressed. For example, if the haze value is 90% or more, the degree of freedom in designing the inter-panel distance dFR to obtain desired image quality can be increased. However, in a case where the haze value becomes high, there is a concern that the luminance will decrease. Thus, it is desirable to reduce the resolution of the rear liquid crystal cell 3 and remove the color filter.

Further, also in a case where the haze value of the diffusion layer 4 is low, desired image quality can be obtained by arranging the diffusion layer 4 close to the front liquid crystal cell 2, for example.

The backlight 5 has a diffusion plate 141 in addition to a light emitting array 42. The diffusion plate 141 diffuses light emitted from the light emitting array 42.

The light emitting array 42 is configured by arraying LEDs, for example.

<2. First Embodiment>

A configuration of the dual cell image processing unit 12 as a first embodiment will be described with reference to FIGS. 4 and 5.

Figure 4:
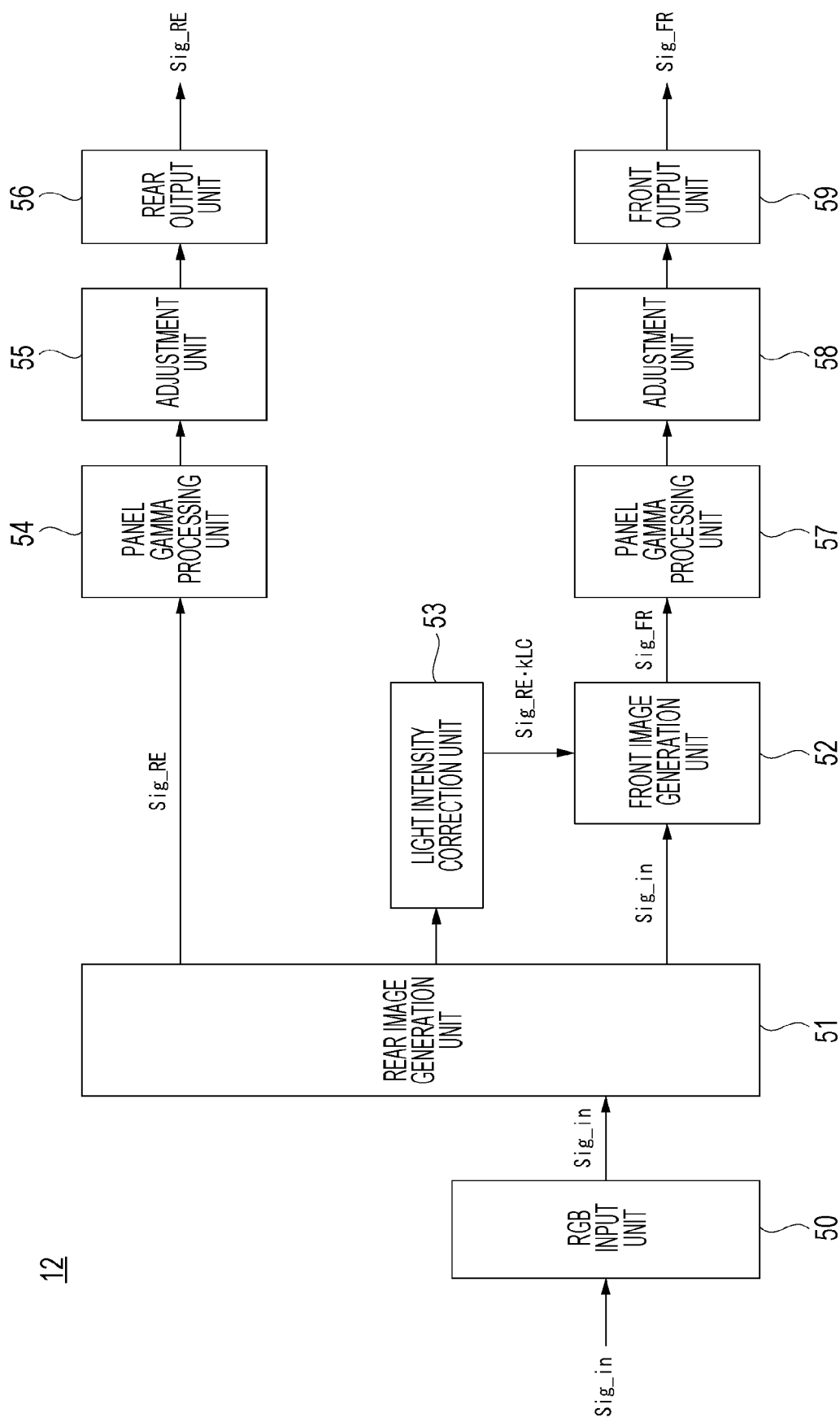
FIG. 4 is a block diagram of a dual cell image processing unit of the embodiment.
Figure 5:
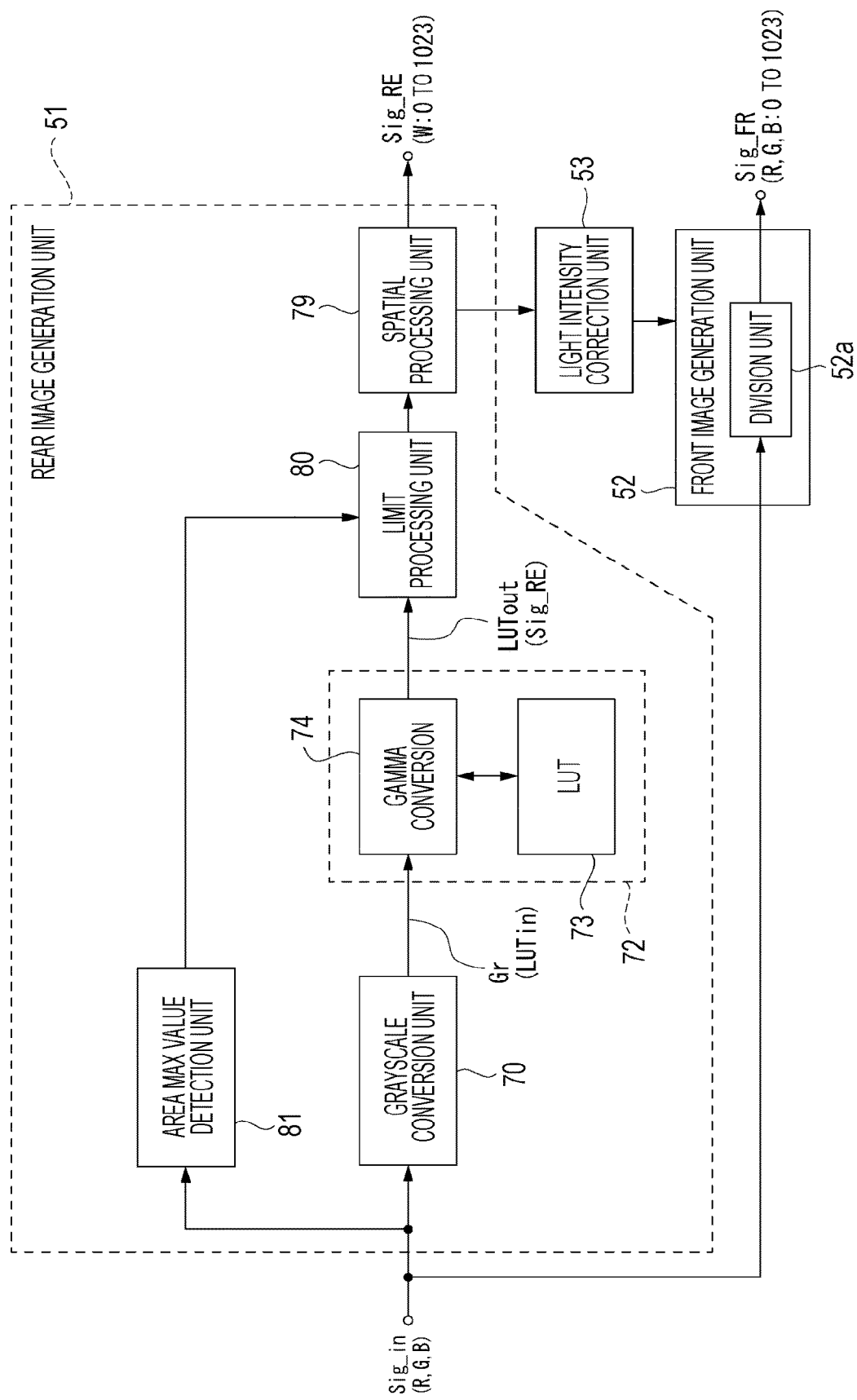
FIG. 5 is a block diagram of a main part of the dual cell image processing unit of a first embodiment.

FIG. 4 is a block diagram of the dual cell image processing unit 12, and FIG. 5 is a block diagram illustrating an inside of a rear image generation unit 51 in FIG. 4 in detail.

As illustrated in FIG. 4, the dual cell image processing unit 12 has an RGB input unit 50, the rear image generation unit 51, a front image generation unit 52, a light intensity correction unit 53, panel gamma processing units 54 and 57, adjustment units 55 and 58, a rear output unit 56, and a front output unit 59.

An image signal Sig_in from the display image processing unit 11 is input to the RGB input unit 50, and is supplied from the RGB input unit 50 to the rear image generation unit 51.

The image signal Sig_in is, for example, a signal having 1024 gradations by 10 bits for each of R, G, and B. Of course, having the 1024 gradations (10 bits) is only an example for explanation, and signals having a smaller or larger number of gradations (bit length) may be used.

The rear image generation unit 51 generates a rear image signal Sig_RE by a process as described later. The rear image signal Sig_RE is, for example, a W (white) signal having 1024 gradations (10 bits: 0 to 1023).

The rear image signal Sig_RE is subjected to a gamma process according to the rear liquid crystal cell 3 in the panel gamma processing unit 54, and then subjected to necessary adjustment processing in the adjustment unit 55. Then, it is subjected to delay adjustment processing, parallelization corresponding to the three sub-pixels 36, and the like in the rear output unit 56, and is supplied to the rear liquid crystal cell drive unit 30.

Note that in a case where the sub-pixels are not formed in the rear liquid crystal cell 3 as described above, the rear image signal Sig_RE is output in a manner corresponding to the front image signal Sig_FR at three timings corresponding to the three sub-pixels 26R, 26G, and 26B in the front liquid crystal cell 2.

The rear image signal Sig_RE generated by the rear image generation unit 51 is also supplied to the light intensity correction unit 53. The light intensity correction unit 53 multiplies the rear image signal Sig_RE by a light intensity correction coefficient kLC for correcting a light intensity component incident on the front liquid crystal cell 2, and outputs a signal to the front image generation unit 52.

The light intensity correction coefficient kLC is a fixed value, for example. However, the light intensity correction coefficient kLC may be a variable value. For example, the light intensity correction coefficient kLC may be adaptively calculated according to an image.

The image signal Sig_in is supplied to the front image generation unit 52. The front image generation unit 52 is provided with a division unit 52a as illustrated in FIG. 5, and generates the front image signal Sig_FR by dividing the input image signal Sig_in by the rear image signal Sig_RE.

In a case of the dual cell type liquid crystal display panel 1, an image in which an image in the rear liquid crystal cell 3 and an image in the front liquid crystal cell 2 are combined is visually recognized as a display image. That is, an image in which luminance of the rear liquid crystal cell 3 and luminance of the front liquid crystal cell 2 are multiplied is displayed.

Therefore, regarding the front image signal Sig_FR, by dividing luminance thereof by the amount of the rear image signal Sig_RE, display according to luminance of the original image signal Sig_in can be performed for each pixel. For such reason, the front image signal Sig_FR is generated by dividing the image signal Sig_in by the rear image signal Sig_RE.

However, in reality, since a light intensity difference occurs from the emission from the rear liquid crystal cell 3 until the incidence on the front liquid crystal cell 2, to be accurate, it is necessary to make a correction rather than a simple division. Accordingly, the light intensity correction unit 53 corrects the rear image signal Sig_RE (Sig_RE·kLC).

Therefore, in the front image generation unit 52 (division unit 52a), the front image signal Sig_FR is calculated as Sig_FR=Sig_in/(Sig_RE·kLC).

Here, the image signal Sig_in is a signal including gradation values Sig_in(R), Sig_in(G), and Sig_in(B) of R, G, and B, and thus more specifically, for the front image signal Sig_FR, gradation values Sig_FR(R), Sig_FR(G), and Sig_FR(B) of R, G, and B thereof are generated. That is, the front image signal Sig_FR is generated as Sig_FR(R)=Sig_in(R)/(Sig_RE·kLC), Sig_FR(G)=Sig_in(G)/(Sig_RE·kLC), and Sig_FR(B)=Sig_in(B)/(Sig_RE·kLC).

Each of the gradation values Sig_FR(R), Sig_FR(G), and Sig_FR(B) of R, G, and B is, for example, 10-bit signals having 1024 gradations (0 to 1023).

Note that, for example, in a case where the liquid crystal display panel 1 has a structure in which the light intensity correction is less necessary, it is conceivable to set Sig_FR=Sig_in/Sig_RE without giving the light intensity correction coefficient kLC.

The front image signal Sig_FR generated by the front image generation unit 52 is subjected to a gamma process according to the front liquid crystal cell 2 in the panel gamma processing unit 57 illustrated in FIG. 4, and then subjected to necessary adjustment processing in the adjustment unit 58. Then, the front output unit 59 performs parallelization and the like corresponding to the three sub-pixels 26R, 26G, and 26B, and supplies the signals to the front liquid crystal cell drive unit 20.

A configuration in the rear image generation unit 51 will be described with reference to FIG. 5.

In the rear image generation unit 51, the image signal Sig_in that is an input color image signal is converted into a grayscale signal (monochrome image signal) Gr by a grayscale conversion unit 70.

The grayscale conversion is performed as follows using the coefficients kR, kG, and kB.

Gr=kR·Sig_in(R)+kG·Sig_in(G)+kB·Sig_in(B)

That is, the coefficient kR for R, the coefficient kG for G, and the coefficient kB for B are multiplied corresponding to the respective gradation values Sig_in(R), Sig_in(G), and Sig_in(B) of R, G, and B included in the image signal Sig_in, and they are added to obtain a grayscale signal Gr. This grayscale signal Gr has a gradation value (0 to 1023) as W (white).

Such a grayscale signal Gr is supplied to a gradation conversion unit 72 and subjected to gradation value conversion.

The gradation conversion unit 72 includes a look up table (LUT) 73 and a gamma conversion unit 74. The gamma conversion unit 74 refers to the LUT 73 using the gradation value of the input grayscale signal Gr as an LUT input signal LUT in, and obtains a corresponding output gradation value (LUT output signal LUTout). Then, the output gradation value LUTout is output as the rear image signal Sig_RE. In this case, the rear image signal Sig_RE is supplied to a limit processing unit 80.

FIG. 6A illustrates an example of conversion characteristics in the gradation conversion unit 72. That is, a conversion curve is illustrated as an input gradation (horizontal axis)-output gradation (vertical axis) of the LUT 73.

In this case, a gamma value is set to a value smaller than "1", and a value after gamma conversion is higher than a value before gamma conversion.

Further, FIG. 6B represents light transmittance of the front liquid crystal cell 2 and the rear liquid crystal cell 3. In FIG. 6B, the horizontal axis illustrates the gradation level of a signal supplied to the front liquid crystal cell 2 and the rear liquid crystal cell 3, and the vertical axis represents transmittances L2 and L3. Here, the transmittance L2 indicates transmittance of the front liquid crystal cell 2, and the transmittance L3 indicates transmittance of the rear liquid crystal cell 3.

In the front liquid crystal cell 2, the transmittance L2 changes according to the gradation level in a range where the gradation level is higher than a certain level (for example, a level of about 40[%]), but the transmittance L2 is almost constant in a range lower than that level. That is, the transmittance L2 of the front liquid crystal cell 2 does not decrease sufficiently in the low gradation range.

Accordingly, in the liquid crystal display panel 1, the transmittance L3 in the rear liquid crystal cell 3 is kept constant (100%) in a range where the gradation level is high, and the transmittance L3 in the rear liquid crystal cell 3 is changed according to the gradation level in the range described above, for example, where the gradation level is lower than about 40[%].

Thus, in the liquid crystal display panel 1, a product Ltotal of the transmittance L2 in the front liquid crystal cell 2 and the transmittance L3 in the rear liquid crystal cell 3 can be changed according to the gradation level also in the range where the gradation level is low similarly to the range where the gradation level is high. Therefore, in the liquid crystal display panel 1, for example, the transmittance Ltotal can be lowered in the low gradation range as compared to a case of a configuration using one liquid crystal cell, and thus contrast can be enhanced.

The gradation conversion unit 72 performs gamma conversion so that this transmittance L3 illustrated in FIG. 6B can be achieved. The conversion characteristic in this case is as illustrated in FIG. 6A, for example. That is, the output gradation value is set to be the highest gradation value in the range where the input gradation value is higher than a certain gradation value.

A signal output as the output gradation value LUTout from the gradation conversion unit 72 becomes the rear image signal Sig_RE.

The limit processing unit 80 performs a process of limiting an upper limit value of the rear image signal Sig_RE output from the gradation conversion unit 72.

The limit value in the limit processing unit 80 is determined by an output value from an area max value detection unit 81.

The area max value detection unit 81 detects a maximum value among the respective gradation values Sig_in(R), Sig_in(G), and Sig_in(B) of R, G, and B in the input image signal Sig_in, and outputs the detected maximum value to the limit processing unit 80. In the example of FIG. 5, this maximum value is used as a limit value in the limit processing unit 80.

The limit processing unit 80 and the area max value detection unit 81 will be described in detail later.

A spatial processing unit 79 performs a process like a spatial filter on the rear image signal Sig_RE that has passed through the limit processing unit 80. This is a process of expanding like a filter while maintaining a peak gradation of the rear image signal Sig_RE.

For example, the spatial processing unit 79 performs a filter process using a finite impulse response (FIR) filter. This FIR filter functions as a low-pass filter and blurs an image displayed on the rear liquid crystal cell 3. Thus, in the display device 90, the possibility of an image defect or a double image to occur in a display image when an observer observes the display image can be reduced. The number of taps of the FIR filter is set according to the target value e of a viewing angle that does not cause an image defect or a double image in the display image.

Figure 7:
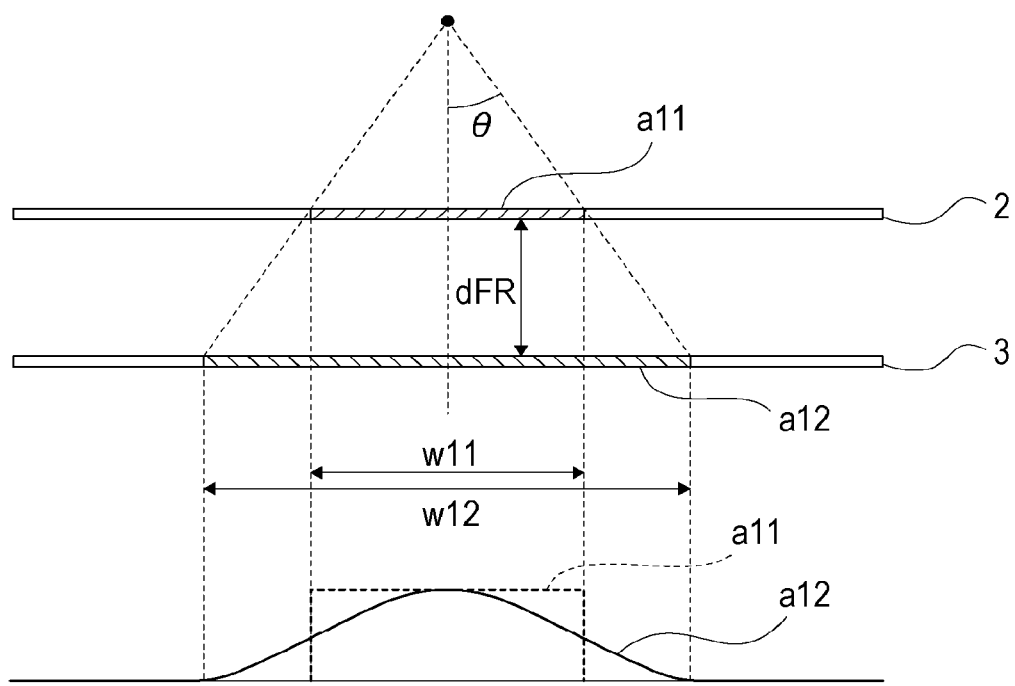
FIG. 7 is an explanatory diagram of a spatial filter process for blurring the rear liquid crystal cell side of the embodiment.

FIG. 7 is for explaining a spatial filter process by the spatial processing unit 79, and illustrates a cross-sectional schematic diagram of the front liquid crystal cell 2 and the rear liquid crystal cell 3 together with gradations (luminance) in the respective liquid crystal cells 2 and 3.

In this example, the front liquid crystal cell 2 displays a display element a11, and the rear liquid crystal cell 3 displays a display element a1t at a position corresponding to the display position of the display element a11 in the front liquid crystal cell 2. Since the display element a12 is blurred by the spatial filter process, a width w12 of the display element a12 is larger than a width w11 of the display element a12.

The gradation of the display element a11 is constant with an original gradation value of the display element a11 within a transmission range as depicted by a dashed line. On the other hand, the gradation of the display element a11 has a mountainous distribution as depicted by a solid line. In the spatial filter process, a transmission pixel range in the rear liquid crystal cell 3 is made larger than that in the front liquid crystal cell 2, and moreover, the rear image signal Sig_RE is subjected to a process such that the image is blurred by a mountainous gradation change occurring as described above.

The effect of the spatial filter process on such a rear image signal Sig_RE will be described.

FIGS. 8A and 8B illustrate schematic cross-sectional views of the front liquid crystal cell 2 and the rear liquid crystal cell 3 and the gradation (luminance) in each of the liquid crystal cells 2 and 3, similarly to FIG. 7. FIG. 8A illustrates a case where the rear image signal Sig_RE is subjected to the spatial filter process, and FIG. 8B illustrates a case where it is not subjected to the spatial filter process.

In a case where the spatial filter process is not performed, the display element a13 displayed on the rear liquid crystal cell 3 has the same width as the display element a11 displayed on the front liquid crystal cell 2, and a change in luminance is steep, as illustrated in FIG. 8B.

When a user in the direction of an angle φ from a normal direction of the display plane observes such a display image, the display element a11 is observed in a range C11.

At this time, in the range C11, there occurs a portion where transmittance of light in the front liquid crystal cell 2 is high but transmittance of light in the rear liquid crystal cell 3 is low. Therefore, a part of the display element a11 may be visually recognized as being partially cut.

Further, in a range C13, the transmittance of light in the front liquid crystal cell 2 is low, but the transmittance of light in the rear liquid crystal cell 3 is high. Then, if the transmittance of the front liquid crystal cell 2 in this range C13 is not sufficiently low, it is possible that a double image occurs in the display image.

On the other hand, in the case of FIG. 8A, since the display element a12 displayed on the rear liquid crystal cell 3 is blurred by the spatial filter process, it has a large width and has luminance that changes gently, unlike the display element a11 displayed on the front liquid crystal cell 2.

When the user in the direction of the angle φ from the normal direction of the display plane observes the display element a11 in the range C11, the transmittance of light in the display element a11 is high, and the transmittance of light in the display element a12 changes gently. Thus, it is less likely that image defect will occur.

Further, in a range C12, the transmittance of light in the front liquid crystal cell 2 is low, and the transmittance of light in the rear liquid crystal cell 3 changes gently. Therefore, in the display device 1, the possibility of a double image to occur in the display image can be reduced. Consequently, the display device 90 can be improved in image quality.

As described above, in the first embodiment, with respect to the rear image signal Sig_RE, the rear image signal Sig_RE is generated and output through respective processes of the grayscale conversion unit 70, the gradation conversion unit 72, the limit processing unit 80, and the spatial processing unit 79.

Then, in particular, the image quality is improved by adaptively limiting the upper limit value of the rear image signal Sig_RE by the limit processing unit 80 and the area max value detection unit 81. Specifically, in the display device 90, light leakage generated around an isolated white spot is reduced by lowering the signal level of the rear liquid crystal cell 3. Further, by reduction in the light leakage, the double image seen from an angle is improved.

Figure 9:
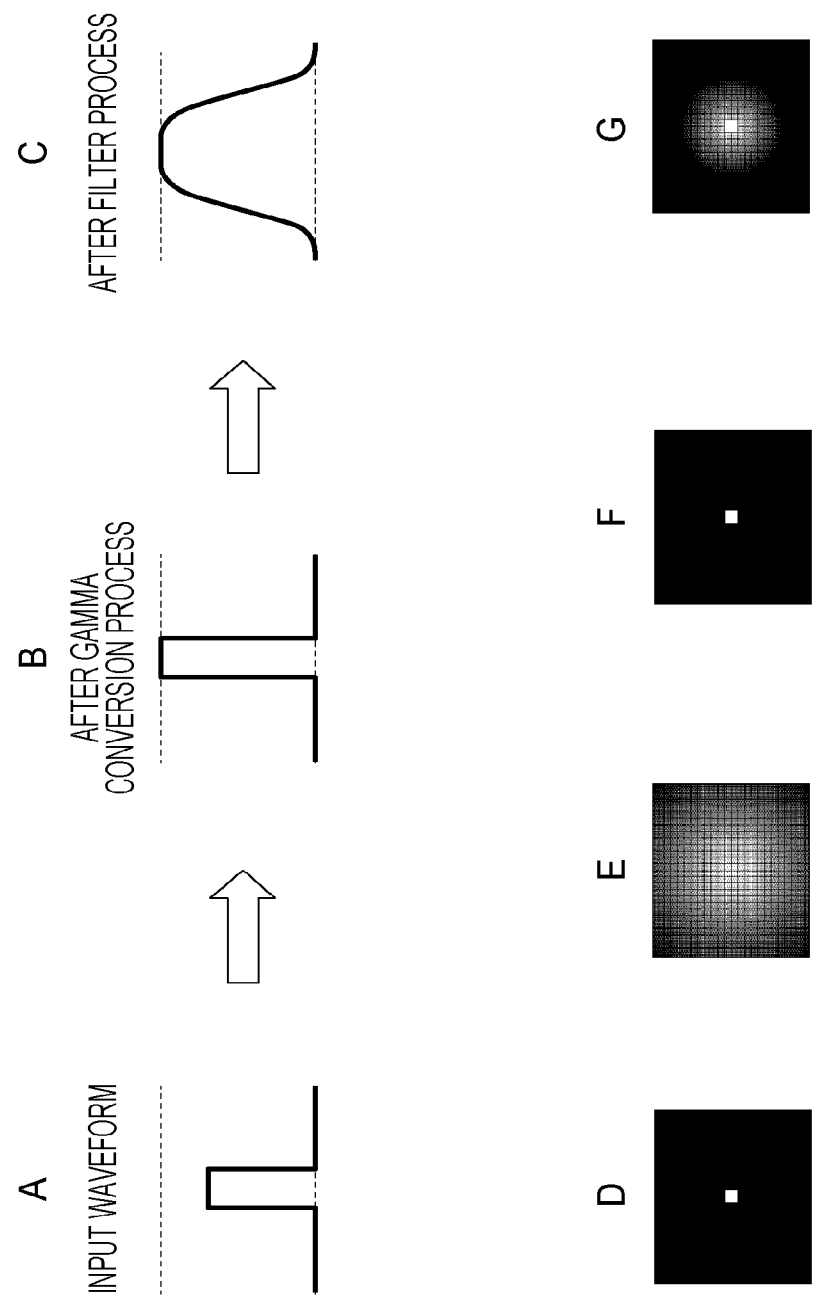
FIG. 9 is an explanatory diagram of light leakage around a white spot.

First, referring to FIG. 9, occurrence of light leakage around a white spot will be described. Here, it is assumed that the limit processing unit 80 is not provided.

It is assumed that FIG. 9A illustrates a part of the waveform of the input image signal Sig_in. Thus, it is assumed that the input image signal Sig_in is a signal corresponding to the gradation value of a white spot portion for displaying a white image of a small dot as illustrated in FIG. 9D. The level of a dashed line indicates the highest gradation. The grayscale signal Gr converted from the image signal Sig_in also has a waveform with a gradation close to this gradation.

As can be seen from the process of FIG. 5 described above, the grayscale signal Gr is converted by the gradation conversion unit 72 to have a waveform as illustrated in FIG. 9B, for example. That is, it is assumed to be converted to have the highest gradation value by the gamma characteristic of FIG. 6A. This becomes the rear image signal Sig_RE.

The rear image signal Sig_RE is further processed by the spatial processing unit 79 to have a waveform having a spread in the spatial direction as illustrated in FIG. 9C (with the gradation level being in a mountainous distribution).

Then, the image of the rear liquid crystal cell 3 by the rear image signal Sig_RE becomes an image in which a white spot is widely blurred as illustrated in FIG. 9E. The image of the front liquid crystal cell 2 is an original image of white dots as illustrated in FIG. 9F.

A combined image of these FIGS. 9E and 9F is visually recognized by an observer, and this image is as illustrated in FIG. 9G. That is, light leakage occurs around the white spot. Such light leakage is likely to occur when the rear image signal Sig_RE has the highest gradation value and the luminance of the rear liquid crystal cell 3 increases.

Therefore, in order to reduce the light leakage, it is sufficient to suppress the increase in the luminance of the rear liquid crystal cell 3 to some extent.

FIG. 10A illustrates a waveform of the image signal Sig_in input similarly to FIG. 9A, and FIGS. 10B and 10C illustrate waveforms of the rear image signal Sig_RE and the front image signal Sig_FR to be generated.

FIG. 10B is a case where particularly the rear image signal Sig_RE is not subjected to the limit process and is a state that the luminance of the rear liquid crystal cell 3 is high, and FIG. 10O is a state where the rear image signal Sig_RE is subjected to the limit process and is a state that the luminance of the rear liquid crystal cell 3 is suppressed.

In the case of FIG. 10B, a flare due to light leakage is conspicuous and the contrast is also deteriorated. On the other hand, a case of FIG. 10C, by suppressing the luminance of the rear liquid crystal cell 3, the flare due to light leakage is suppressed, and thereby the contrast is also improved.

Therefore, in the present embodiment, the limit processing unit 80 and the area max value detection unit 81 are provided to improve the image quality as illustrated in FIG. 10C.

Figure 11:
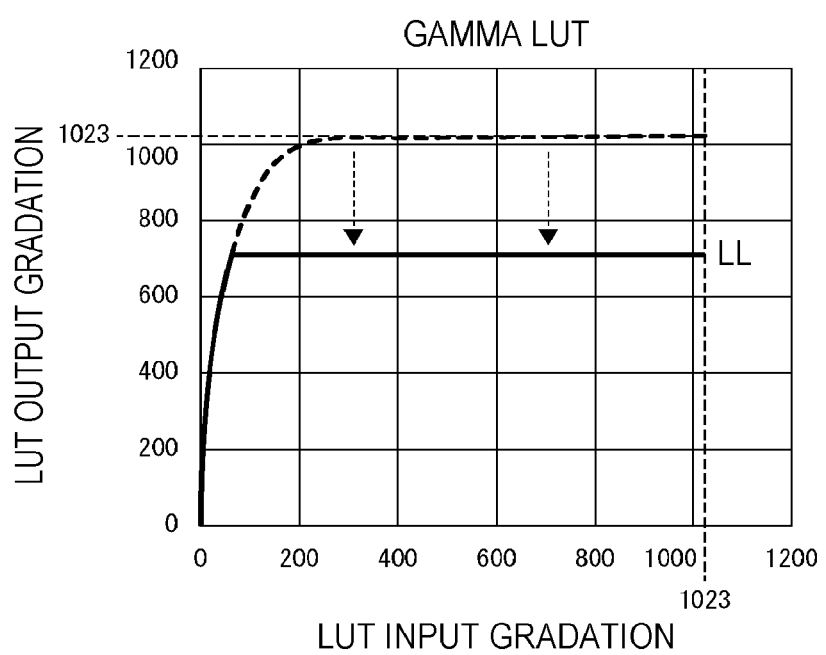
FIG. 11 is an explanatory diagram of a limit process of the embodiment.

For the rear image signal Sig_RE supplied from the gradation conversion unit 72, the limit processing unit 80 limits the gradation value as the upper limit to a value lower than the maximum gradation value (1023 in this example), as illustrated in FIG. 11. This FIG. 11 illustrates that the gradation value to be output is limited to a limit value LL as illustrated by the solid line with respect to the gamma conversion characteristic illustrated in FIG. 6A.

Then, the limit processing unit 80 uses a maximum value detected by the area max value detection unit 81 as the limit value LL.

The area max value detection unit 81 divides an image of one frame into a plurality of areas AR00 to ARnm and detects a maximum value of the image signal Sig_in input for every area, as illustrated in FIG. 12A, for example. Note that here, an example in which (n+1)×(m+1) areas are formed by dividing the image into n+1 areas in the horizontal direction and m+1 areas in the vertical direction, but the number of areas when dividing areas is not limited. It is only required to be two or more areas.

Further, the area max value detection unit 81 is not necessarily limited to the dividing of areas. The maximum value may be detected by setting the number of areas to "1" and using the entire area as one area AR as illustrated in FIG. 12B.

The area max value detection unit 81 supplies the maximum value for every area to the limit processing unit 80.

The limit processing unit 80 performs the limit process on the gradation value of each pixel indicated by the rear image signal Sig_RE with the maximum value of the corresponding area as the limit value LL.

For example, if the maximum value of the area AR00 in the image signal Sig_in is "852", the limit processing unit 80 performs the limit process so that the upper limit of the gradation value of the pixel of the area AR00 in the rear image signal Sig_RE becomes "852".

Further, for example, when the maximum value of the area AR01 in the image signal Sig_in is "623", the limit processing unit 80 performs the limit process so that the upper limit of the gradation value of the pixel of the area AR01 in the rear image signal Sig_RE becomes "623".

In this manner, by limiting the upper limit value of the rear image signal Sig_RE output from the gradation conversion unit 72 in the limit processing unit 80 by using the maximum value of the image signal Sig_in detected by the area max value detection unit 81, the level of the converted rear image signal Sig_RE after gamma conversion will not exceed the maximum value of the input image signal Sig_in.

Since the gamma value of the gamma conversion unit 74 is set to "1" or less, the signal level after gamma conversion becomes higher than the input level, but due to operation of the area max value detection unit 81 and the limit processing unit 80, the signal level of the rear image signal Sig_RE becomes low.

Since the light leakage around the white spot, which had caused image quality deterioration, has been emphasized by increase in the signal level of the rear image signal Sig_RE, the operation described above lowering the signal level of the rear image signal Sig_RE can reduce the light leakage around the white spot, thereby improving the image quality.

Further, in a case where the area max value detection unit 81 sets the number of areas to one and detects the maximum value of the entire screen, if a signal with a high signal level is input even at any one point, the signal level thereof becomes the limit value LL of the limit processing unit 80, and the effect of reducing light leakage is diminished.

By increasing the number of areas as a detection unit in the area max value detection unit 81, even when an image with a large luminance difference enters in the screen, the limit value LL becomes low in an area without a high signal compared to the case where the number of areas is one, and the effect of reducing light leakage is enhanced. Therefore, the image quality improving effect increases as the number of areas increases. On the other hand, since the circuit scale increases as the number of areas increases, it is desirable to select an appropriate number of areas according to the product to which it is applied.

Note that the number of divisions of an area is the number of pixels (that is, one pixel is one area) in an extreme case, but of course it is not realistic, and it goes without saying that one area has a significant number of pixels (the number of pixels determined by considering the image quality improving effect and the circuit scale).

Moreover, the number of pixels in each area and the area shape do not necessarily have to be the same.

<3. Second Embodiment>

A second embodiment will be described. Note that in the drawings used in the following embodiment, the description will focus on differences in configuration from FIG. 5 in the first embodiment, and the same parts as those in FIG. 5 will be assigned the same reference numerals and overlapping description will be avoided.

Figure 13:
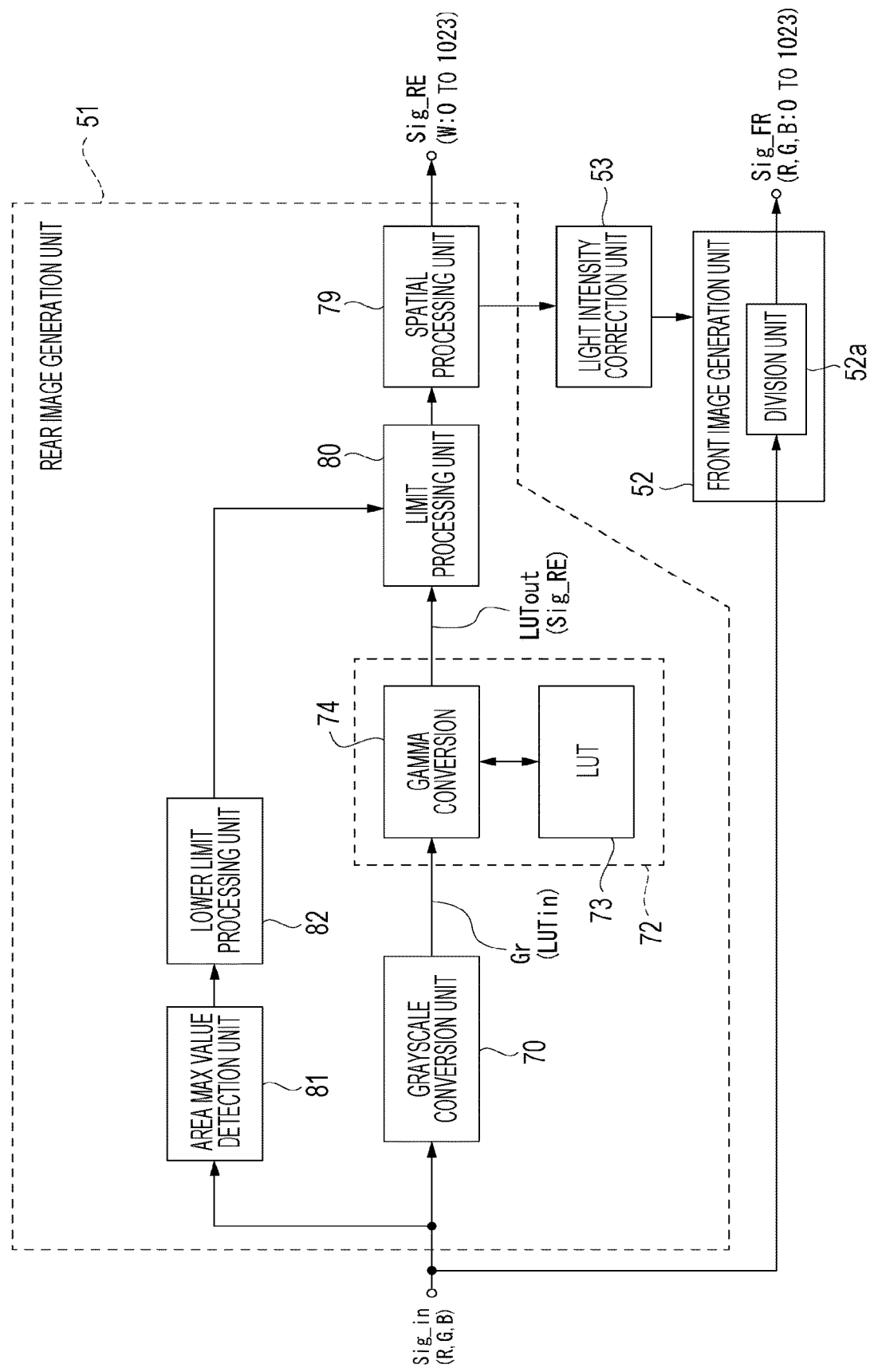
FIG. 13 is a block diagram of a main part of a dual cell image processing unit of a second embodiment.

FIG. 13 illustrates a rear image generation unit 51 as the second embodiment.

In this case, a lower limit processing unit 82 is provided in addition to the configuration of FIG. 5.

An output of the lower limit processing unit 82 is supplied to the limit processing unit 80. This lower limit processing unit 82 sets the lower limit value of the limit value LL in the limit processing unit 80.

Regarding the lower limit processing unit 82, if the maximum value for each area detected by the area max value detection unit 81 is equal to or larger than a set lower limit value, the maximum value detected by the area max value detection unit 81 is output as it is to the limit processing unit 82, or if the maximum value is less than the lower limit value, the lower limit value is output as the maximum value to the limit processing unit 82. That is, the detected maximum value is replaced with the lower limit value that is larger than the maximum value and then output.

Thus, the maximum value of each area supplied to the limit processing unit 82 does not fall below the lower limit value.

In a case where the number of areas of the area max value detection unit 81 is set to two or more, the limit value LL in the limit processing unit 80 differs depending on the area. Thus, even if the rear image signal Sig_RE input to the limit processing unit 80 has the same signal level (gradation value), the signal level may be in a different state depending on the area after the limit process.

At this time, in order to make the displayed image match the input image even if the signal level on the rear liquid crystal cell 3 side is different, the signal level of the front image signal Sig_FR is adjusted by the processes of the light intensity correction unit 53 and the division unit 52a.

However, if the signal level of the front image signal Sig_FR deviates from the optimum level due to factors such as insufficient correction accuracy, temperature, viewing angle characteristic, and the like, even if the signal level is the same in the stage of the input image signal Sig_in, a difference may occur in luminance depending on the area.

This difference increases as the difference in signal level of every area of the rear image signal Sig_RE increases. Therefore, by setting a lower limit to the limit value LL in the limit processing unit 80 by the lower limit processing unit 82, the limit range of the limit processing unit 80 is narrowed. By narrowing the limit range, the signal level difference in every area of the rear image signal Sig_RE also becomes small, and the image difference due to the location on the screen also becomes small.

<4. Third Embodiment>

Figure 14:
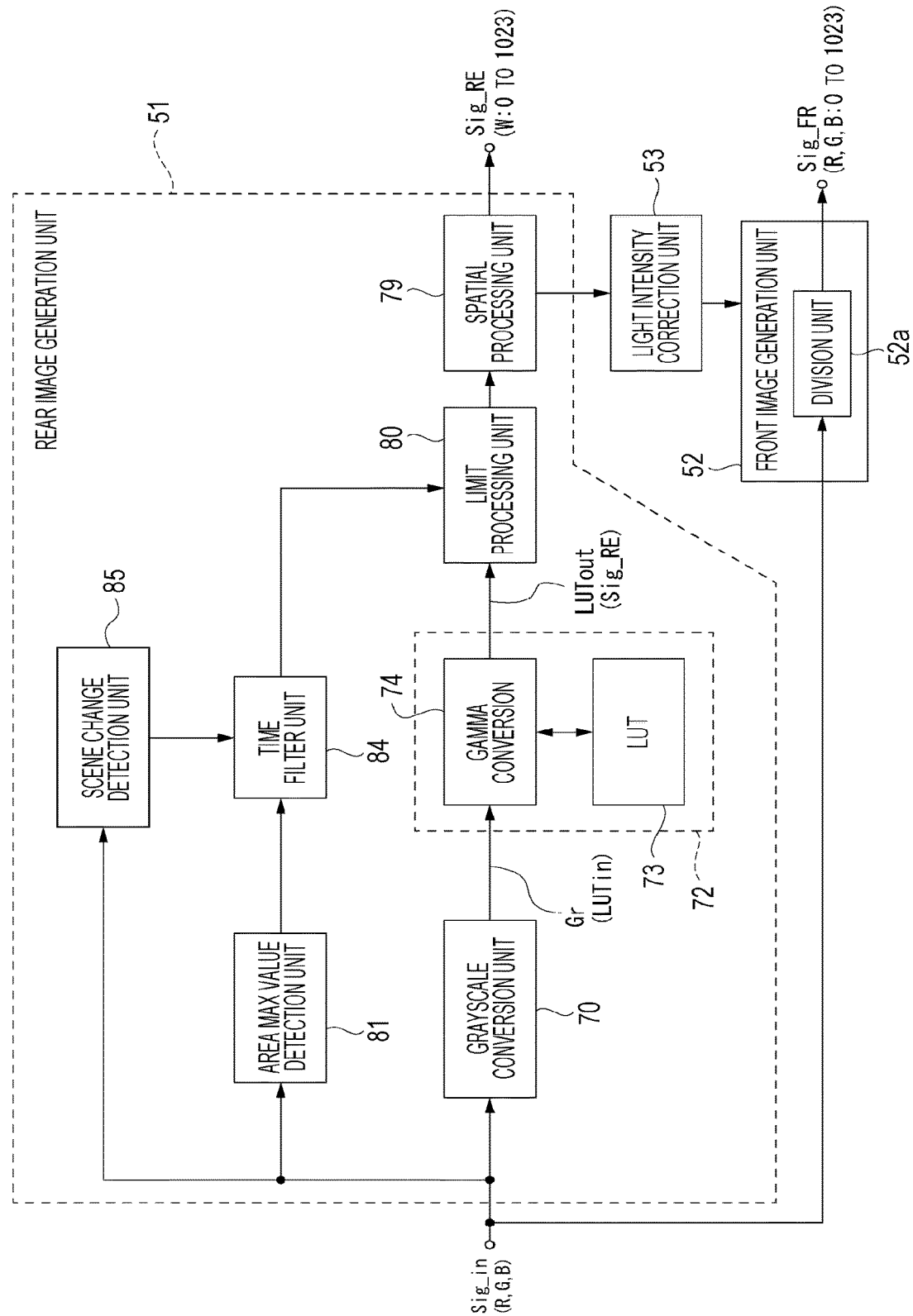
FIG. 14 is a block diagram of a main part of a dual cell image processing unit of a third embodiment.

FIG. 14 illustrates a configuration of a third embodiment. In this example, a time filter unit 84 that suppresses a rapid change in the limit value LL and a scene change detection unit 85 that detects a scene change of an image are provided.

The time filter unit 84 has an input signal and a signal that is output in the past, and performs a filter process so that an output signal does not change rapidly between frames. The input in this case is the maximum value of each area detected by the area max value detection unit 81. That is, the time filter unit 84 performs the filter process so that the maximum value of each area supplied to the limit processing unit 80 does not change rapidly in the time axis direction.

The time filter unit 84 may be a filter having any characteristics as long as it can suppress a rapid change in the output signal (maximum value).

The maximum value output from the time filter unit 84 becomes the limit value in the limit processing unit 80.

When the maximum value of the image signal Sig_in detected by the area max value detection unit 81 changes rapidly, the limit value LL in the limit processing unit 80 changes rapidly and the signal level of the rear image signal Sig_RE changes rapidly.

In the division unit 52*a*, the signal level of the front image signal Sig_FR is adjusted so that the displayed image matches the input image signal Sig_in, but there may be a case where, due to a response time difference between the front liquid crystal cell 2 and the rear liquid crystal cell 3, a timing at which the signal level of the rear liquid crystal cell 3 changes and a timing at which the adjusted signal level of the front liquid crystal cell 2 changes deviate from each other, causing a momentary change in the displayed image.

In order to suppress such a change in the image to a level that cannot be visually recognized, the time filter unit 84 performs a filter process so that the signal level does not change rapidly between frames (time axis direction).

Furthermore, in the third embodiment, when such a time filter unit 84 is provided, the scene change detection unit 85 is combined.

Then, the time filter unit 84 has a function of changing a filter characteristic or a function of switching between valid and invalid of the filter when a scene change is detected by the scene change detection unit 85.

The scene change detection unit 85 detects a change in the scene as an image content by comparing the current frame of the input image signal Sig_in with a last frame. For example, a scene change is detected when an area whose level has changed in the frame (the number of pixels whose gradation value has changed) is equal to or larger than a set threshold.

Of course, the detection method is not limited to this. For example, the scene change detection unit 85 may detect a scene change from the difference between an average value of all pixels of the input image signal Sig_in and an average value of all pixels of the image signal Sig_in calculated with a last frame.

Furthermore, the scene change detection unit 85 may detect the scene change from the maximum value detected by the area max value detection unit 81 instead of the image signal Sig_in. For example, it is conceivable that if the number of areas in which the maximum value has changed is equal to or larger than a predetermined value, it is determined as a scene change.

The change in the image due to the difference between the timing at which the signal level of the liquid crystal cell 3 described above changes and the timing at which the signal level of the front liquid crystal cell 2 changes is hard to visually recognize in a place (an area on the screen) where the image is moving, but is easily visually recognized in a place where the image is still.

That is, when there is no still place on the screen and the entire screen changes, it is difficult to visually recognize the change in the displayed image. Therefore, it is possible to weaken (or turn off) the filter process of the time filter unit 84. For example, even if a change width of the maximum value allowed between frames is increased or the time filter is turned off, the image quality deterioration is hardly visible.

Here, the change of the entire screen is detected by the scene change detection unit 85 and can be detected as a timing of the scene change.

Thus, the time filter unit 84 changes the filter process of the time filter unit 84 according to the scene change detection.

When the time filter is constantly operated, the image quality improving effect occurs with a delay, but by controlling the time filter by the scene change detection, the delay of the effect can be minimized.

Note that a configuration example in which the scene change detection unit 85 is not provided in FIG. 14 is also possible.

<5. Fourth Embodiment>

Figure 15:
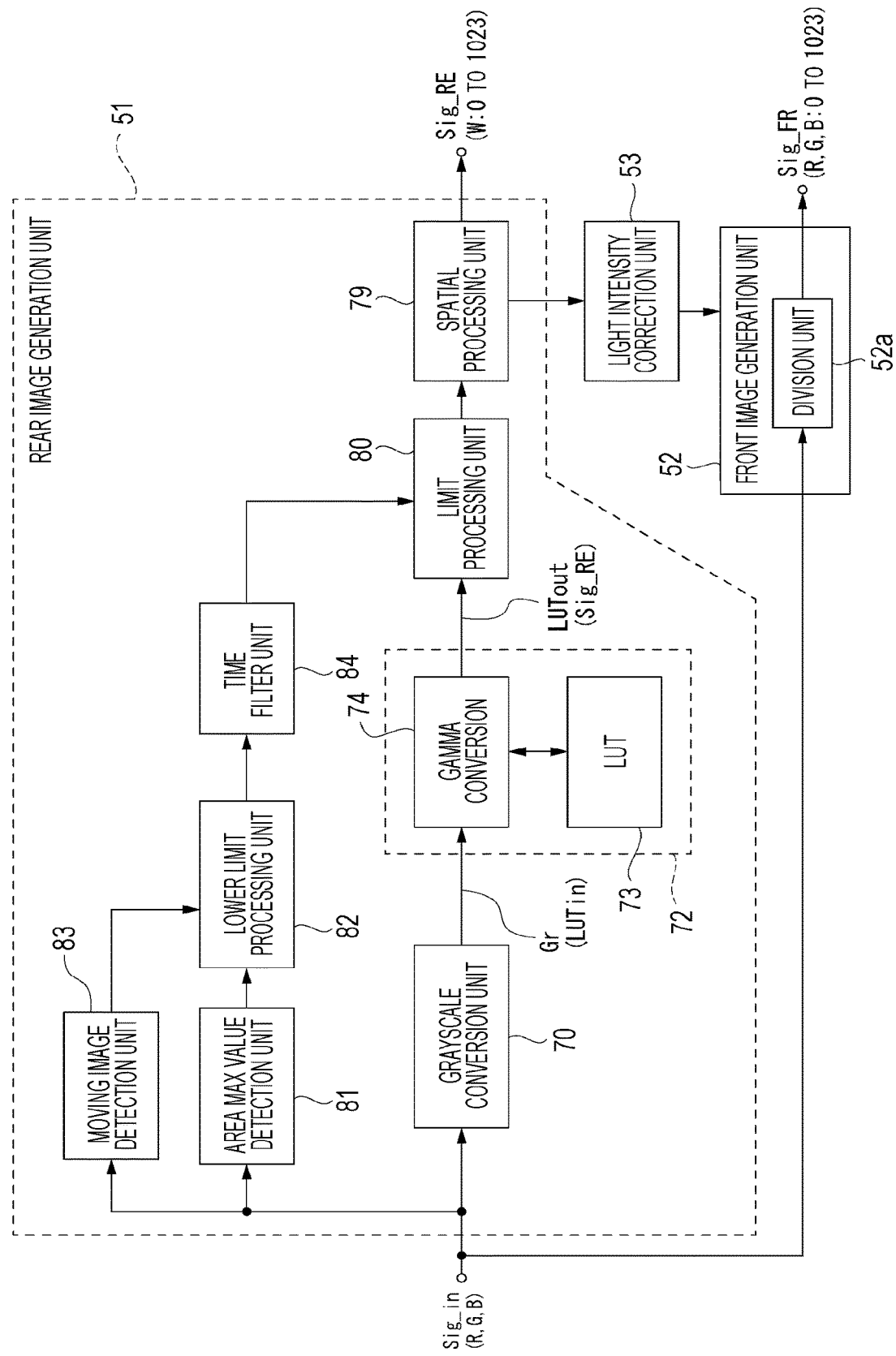
FIG. 15 is a block diagram of a main part of a dual cell image processing unit of a fourth embodiment.

A configuration of a fourth embodiment is illustrated in FIG. 15. In this example, a moving image detection unit 83 that detects whether or not the input image signal Sig_in is a moving image is provided together with the time filter unit 84 and the lower limit processing unit 82.

The moving image detection unit 83 compares the current frame of the input image signal Sig_in with a last frame, and detects the image signal as a moving image if there is a difference in the image signal between frames, or detects the image signal as a still image if there is no difference in the image signal between frames.

Note that the detection method is not limited to this. For example, the moving image detection unit 83 may detect whether or not it is a moving image from the maximum value detected not from the image signal Sig_in but by the area max value detection unit 81. For example, it is conceivable that if an area where the maximum value has changed is present (or if a predetermined number or more is present), it may be determined as a moving image.

Further, even if there is a difference in image signal between frames, the moving image detection unit 83 may detect the image signal as a still image if the changed value is small or the changed area is small.

The lower limit processing unit 82 sets the lower limit of the maximum value detected by the area max value detection unit 81 as described above. Thus, the lower limit value of the limit value LL in the limit processing unit 80 is set. Then, in the case of FIG. 15, the lower limit processing unit 82 switches the set value (the lower limit of the maximum value to be output) between when the image is detected as a moving image and when the image is detected as a still image in the moving image detection unit 83.

The maximum value output from the lower limit processing unit 82 is subjected to a filter process in the time axis direction in the time filter unit 84 to suppress a rapid change, and then supplied to the limit processing unit 80 and used as the limit value LL.

In a case where the time filter unit 84 is provided, if the maximum value input to the time filter unit 84 changes due to operation thereof, a delay of a constant time occurs until the output of the time filter unit 84 approaches the input.

This delay becomes longer as the change amount in the input signal (maximum value detected) increases, but if the limit range of the limit processing unit 80 is narrowed, the change amount in the signal decreases, and the response when the signal changes becomes faster. In order to narrow the limit range of the limit processing unit 80, in a case where the lower limit processing unit 82 is provided, it is only required to narrow the range through which the maximum value is passed as it is by the lower limit processing unit 82.

Further, when the image signal Sig_in is still and the detected maximum value does not change, the delay due to the time filter unit 84 does not matter, but if the image signal Sig_in is a moving image and the detected maximum value varies, it is desirable that the delay time does not become too long.

Accordingly, the moving image detection unit 83 detects a moving image, and when the moving image is input, the lower limit processing unit 82 raises the set value as the lower limit value of the maximum value. By increasing the lower limit value, the limit range of the limit processing unit 80 can be further narrowed, and the delay time can be shortened.

<5. Fifth Embodiment>

Figure 16:
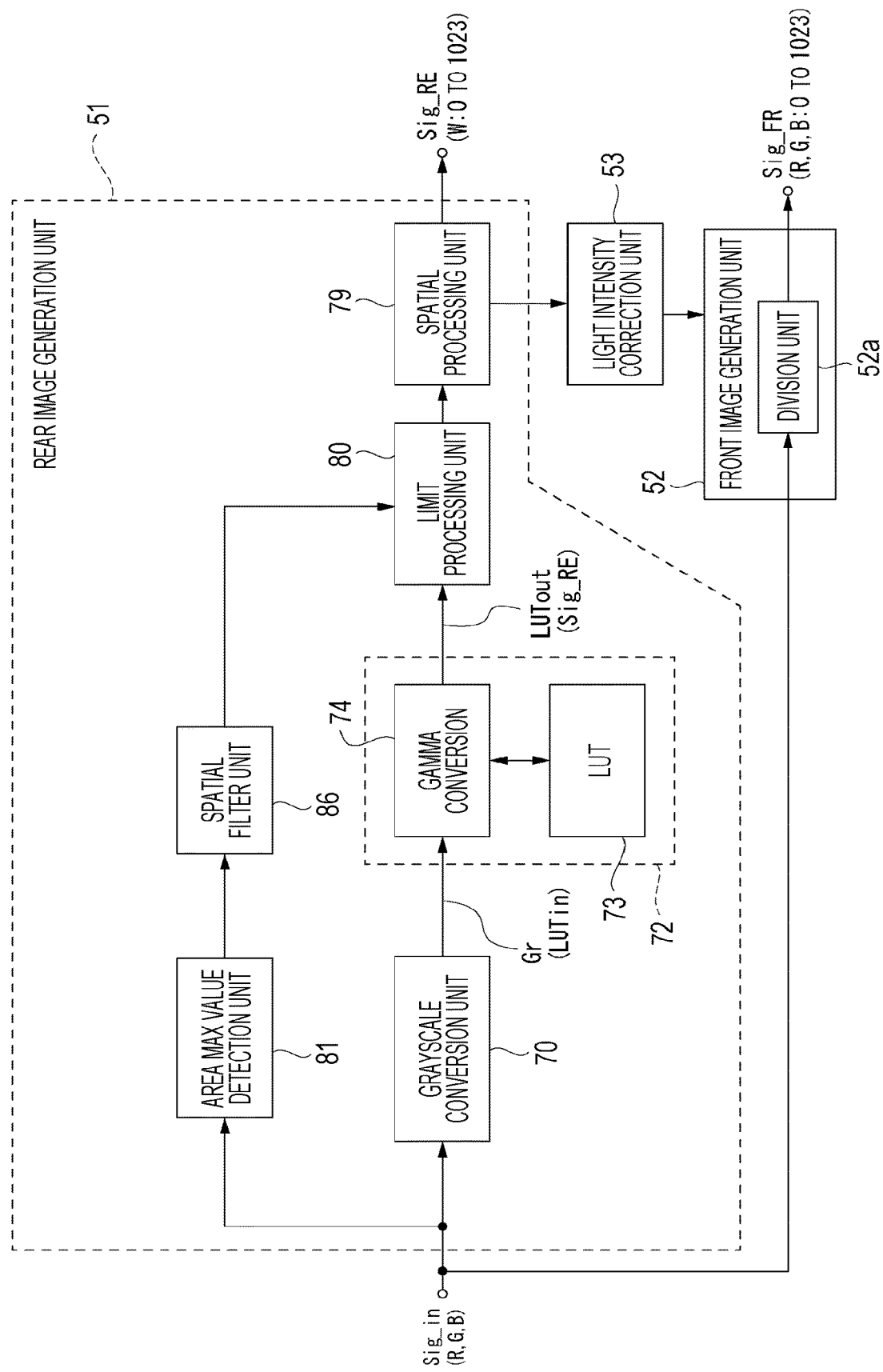
FIG. 16 is a block diagram of a main part of a dual cell image processing unit of a fifth embodiment.

A configuration of a fifth embodiment is illustrated in FIG. 16. In this example, a spatial filter unit 86 is provided, and a maximum value detected by the area max value detection unit 81 is subjected to a spatial filter process by the spatial filter unit 86 and then supplied to the limit processing unit 80.

This spatial filter unit 86 performs the spatial filter process that smoothes changes between areas divided by the area max value detection unit 81. That is, the spatial filter unit 86 performs a filter process to suppress a signal level difference between the areas with respect to the maximum value detected by the area max value detection unit 81 by dividing every area, in order to suppress a rapid change in signal level between the areas.

Further, the filter process of the spatial filter unit 86 is made so that the signal level after the filter process does not become smaller than the input signal.

In a case where the number of areas is set to two or more in the area max value detection unit 81, if the signal level difference between the areas is large, a problem that the signal level difference between the areas appears as a double image can occur when the display device 90 is observed from an angle.

Accordingly, in order to reduce the signal level difference between the areas, the spatial filter unit 86 performs the filter process for suppressing the signal level difference between the areas to improve the double image when observed from an angle.

Note that the spatial filter unit 86 desirably has a function of restoring to the original resolution in a case where it is reduced from the resolution of the image signal Sig_in input by the area max value detection unit 81. When the spatial filter unit 86 restores the resolution to the original resolution, it is conceivable to perform an interpolation process of an insufficient signal.

When the area max value detection unit 81 reduces from the resolution of the image signal Sig_in to the resolution of the number of areas, the spatial filter unit 86 performs the restoration to the original resolution, but at this time, an interpolation process is performed to connect the insufficient signal smoothly, so as to prevent occurrence of the double image due to an adjacent signal level difference.

Note that the above-described interpolation process is not necessary in a case where the area max value detection unit 81 has a sufficiently large number of areas.

Note that in addition to the configuration of FIG. 16, it is conceivable to provide the moving image detection unit 83 described in FIG. 15 and supply a detection result of the moving image detection unit 83 to the spatial filter unit 86. In that case, the spatial filter unit 86 changes the filter characteristic at a time of detecting a moving image and at a time of detecting a still image.

Further, the spatial filter unit 86 is not necessary in a case where the number of areas is set to one in the area max value detection unit 81.

Moreover, the spatial filter unit 86 may be omitted in a case where the area max value detection unit 81 has a sufficiently large number of areas.

<3. Sixth Embodiment>

Figure 17:
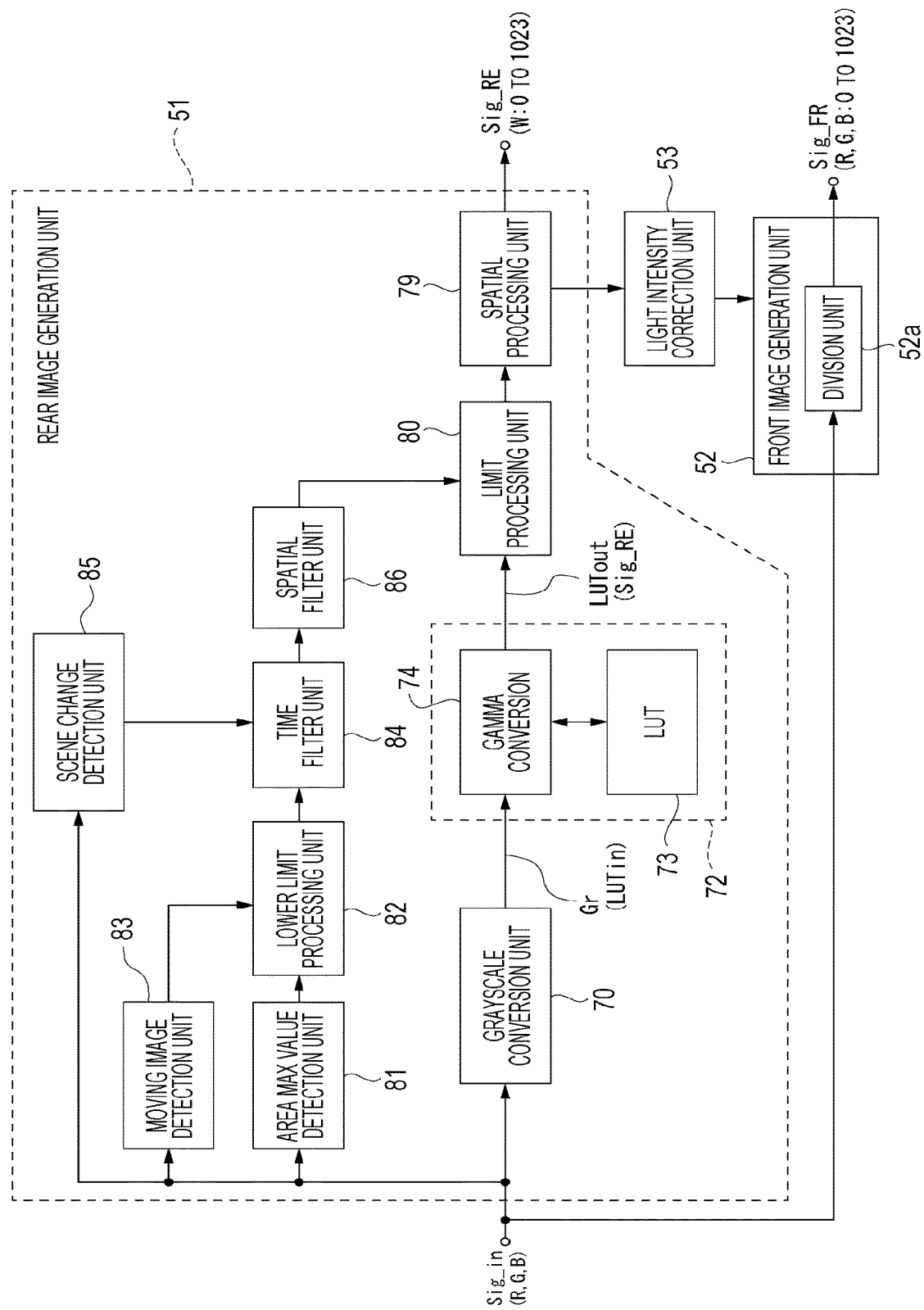
FIG. 17 is a block diagram of a main part of a dual cell image processing unit of a sixth embodiment.

A sixth embodiment is illustrated in FIG. 17. This is an example in which the above-described first to fifth embodiments are combined.

A maximum value detected by the area max value detection unit 81 is set to a lower limit value by the lower limit processing unit 82. Setting of the lower limit value is switched according to detection of a moving image or a still image by the moving image detection unit 83.

A maximum value output from the lower limit processing unit 82 is supplied to the limit processing unit 80 after a rapid change is suppressed by the time filter unit 84 and moreover a change between areas is smoothed by the spatial filter unit 86.

With this configuration example, the effects of the respective embodiments as have been described above can be obtained comprehensively.

<7. Summary and Modification Example>

In the above embodiments, the following effects can be obtained.

A dual cell image processing unit 12 (image processing device) of the embodiment includes a gradation value conversion unit 72 that performs a gradation value conversion on an image signal Sig_in for a liquid crystal display panel 1 in which a display image is generated by light passing through a rear liquid crystal cell 3 and a front liquid crystal cell 2, so as to generate a rear image signal Sig_RE for the rear liquid crystal cell 3, and a limit processing unit 80 that performs a process of limiting a value of the rear image signal Sig_RE output from the gradation value conversion unit 72 to a limit value LL.

That is, the limit process is performed on the rear image signal Sig_RE generated by performing the gradation value conversion.

If the signal level (gradation) of the rear image signal Sig_RE becomes too high, light leakage around the front image may be emphasized and image quality may deteriorate. Accordingly, the rear image signal Sig_RE is subjected to the limit process with the limit value LL by the limit processing unit 80, so as to prevent the gradation of the rear image from becoming too high. Therefore, the signal level of the rear liquid crystal cell 3 is lowered and light leakage around an isolated white spot as a display image is reduced, and thus the image quality can be improved as a result.

Further, the light leakage looks like a double image when the screen is viewed from an angle, and thus the double image when viewed from an angle is also improved by reducing the light leakage.

In the first to sixth embodiments (FIGS. 5, 13, 14, 15, 16, and 17), the area max value detection unit 81 (maximum value detection unit) that detects a maximum value of the input image signal Sig_in is provided, in which the limit processing unit 80 sets the limit value LL to a value based on the maximum value detected by the maximum value detection unit.

By setting the limit value on the basis of the maximum value of the input image signal, that is, the maximum value of the input color image signal Sig_RGB, a limiter process with the limit value suitable for an image content is performed. Thus, appropriate limit control can be achieved.

In the first embodiment (FIG. 5), the limit processing unit 80 sets the maximum value detected by the area max value detection unit 81 as the limit value LL.

That is, the maximum value of the input image signal Sig_in is used as it is as the limit value LL.

Thus, the maximum value of the rear image signal Sig_RE is limited to the maximum value of the input color image signal Sig_RGB. Therefore, the gradation value of the rear image can be prevented from becoming too high, and light leakage can be reduced.

The first to sixth embodiments give an example in which the area max value detection unit 81 detects the maximum value for every area of a plurality of areas set in the image, and the limit processing unit 80 performs, for every area, a limit process with a limit value LL based on a maximum value in the area.

That is, the image area of one frame is divided and set into a plurality of areas. Then, the maximum value of the input signal is detected for every area, and the limit process of the rear image signal Sig_RE is performed for every area with the limit value based on the maximum value.

Thus, the rear image signal Sig_RE is subjected to the limit process with a suitable limit value that differs for every area. For example, when the luminance difference is large on the screen, a limit process suitable for luminance of each of the areas is performed, and the effect of reducing image quality deterioration as described above is appropriately exhibited.

The second, fourth, and sixth embodiments (FIGS. 13, 15, and 17) give an example of including a lower limit processing unit 82 that outputs, if the maximum value detected by the area max value detection unit 81 is less than a lower limit value that is set, the lower limit value as the maximum value.

Due to the limit process of the lower limit value by the lower limit processing unit 82, the maximum value to be a reference for the limit value in the limit processing unit 80 is always equal to or larger than the lower limit value.

Thus, a change in the signal level of the rear image signal Sig_RE can be suppressed, and a change in the displayed image can be minimized that occurs when an error from an optimum value occurs in the signal level of the front image signal Sig_FR.

The third, fourth, and sixth embodiments (FIGS. 14, 15, and 17) give an example of including a time filter unit 84 that suppresses a variation amount in a time axis direction of the maximum value detected by the area max value detection unit 81.

For example, the variation amount is suppressed so that the maximum value of the current frame of the input image signal Sig_in and the maximum value of the previous frame (in a case of dividing into areas, the maximum value of a certain area of the current frame and the maximum value of the corresponding area of all frames) do not change rapidly.

By applying such a time filter, it is possible to reduce a change in the display image that occurs when the signal level of the rear image signal Sig_RE is changed.

The third and sixth embodiments (FIGS. 13 and 17) give an example of including a scene change detection unit 85 that detects a scene change for the image signal Sig_in, in which the time filter unit 84 changes a filter operation if a scene change is detected.

For example, the scene change detection unit 85 detects whether or not a scene as an image content has changed by comparing the current frame and the previous frame. The time filter unit 84 switches the filter characteristic or switches on and off of the filter process in response to detection of a scene change.

The image quality improving effect occurs with a delay by performing the time filter process, and thus the effect may not be exhibited well if there is a scene change. Accordingly, the time filter is controlled by scene change detection. Thus, the delay of the effect can be minimized.

The fourth and sixth embodiments (FIGS. 15 and 17) describe an example of including a lower limit processing unit 82 that sets, if the maximum value detected by the area max value detection unit 81 is less than a lower limit value that is set, the maximum value as the lower limit value, and a moving image detection unit 83 that detects whether or not the input image signal Sig_in is a moving image, in which the lower limit processing unit 82 sets the lower limit value to a different value between when the input image signal Sig_in is a moving image and when the input image signal Sig_in is not a moving image.

For example, the lower limit value in the lower limit process is set to be different between when the input image signal is a moving image and when the input image signal is a still image. That is, in a case of a moving image, the lower limit value is raised.

When inputting a moving image, a signal delay due to the time filter unit 84 may cause a problem. Accordingly, in a case of performing the time filter process, when the input image signal is detected as a moving image, the lower limit value is changed to reduce a change in the signal level of the rear image signal Sig_RE. Thus, the signal delay due to the time filter can be minimized.

The fifth and sixth embodiments (FIGS. 16 and 17) include a spatial filter unit 86 that suppresses a variation amount in a spatial direction of the maximum value in every area of a plurality of areas set in an image.

That is, with respect to the maximum value in each area, the filter process is performed so as not to cause a rapid change in a spatial direction (image plane direction in which a plurality of areas is adjacent to each other).

When the maximum value detection and the limiter process are performed in units of areas by dividing the area, there is a possibility that a double image occurs due to a level difference between areas. Accordingly, a spatial filter is performed to prevent such problems from occurring.

The embodiments give an example in which the gradation value conversion unit 72 performs gamma conversion with a gamma value smaller than one. This is to perform good gradation expression in a state where the front image and the rear image are combined.

By performing the gamma conversion in which the gamma value is smaller than one, the gradation value after the gamma conversion becomes higher than that before the gamma conversion. When the signal level (gradation) of the rear image signal Sig_RE becomes too high due to the gamma conversion, light leakage around the front image is emphasized and image quality deterioration is likely to occur.

Accordingly, in such a case, it is useful to perform the limit process on the rear image signal Sig_RE.

The embodiments include a spatial processing unit 79 that performs on the rear image signal Sig_RE a spatial filter process to make a transmission pixel range of an image in the rear liquid crystal cell 3 larger than that of an image in the front liquid crystal cell 2.

That is, the spatial filter process is performed so as to blur the rear image.

In this manner, for example, a double image is unlikely to occur in the display image and the viewing angle can be improved. However, in this case, light leakage is likely to occur, and thus the image quality deterioration prevention by the limit process becomes more effective.

The dual cell image processing unit 12 of the embodiment also includes a front image generation unit 52 that performs a calculation process using the rear image signal Sig_RE on the image signal Sig_in to generate a front image signal Sig_FR for the front liquid crystal cell 2. The image signal Sig_in input to the dual cell image processing unit 12 is a color image signal, and the gradation value conversion unit 72 performs gradation value conversion on a monochrome image signal (grayscale signal Gr) converted from the color image signal. The front image generation unit 52 generates the front image signal Sig_FR by dividing the image signal Sig_in that is a color image signal by the rear image signal Sig_RE processed by the limit processing unit 80.

That is, each of gradation values of, for example, R, G, and B as an image signal that is a color image signal is divided by the gradation value of the rear image signal after the limit process, so as to obtain the gradation values of R, G, and B as the front image signal.

Thus, it becomes a state that an appropriate gradation can be obtained as an image in which the rear liquid crystal cell 3 and the front liquid crystal cell 2 are overlapped.

The embodiments give an example in which the dual cell image processing unit 12 includes a light intensity correction unit 53 that multiplies the rear image signal Sig_RE by the correction coefficient kLC according to a light intensity component that is incident on the front liquid crystal cell 2, and the front image generation unit 52 generates the front image signal Sig_FR by dividing the image signal Sig_in by the rear image signal Sig_RE obtained by multiplying by the correction coefficient kLC.

It is possible to obtain the front image signal Sig_FR in consideration of the light intensity component incident on the front liquid crystal cell 2 from the rear liquid crystal cell 3, and a state can be achieved that an appropriate gradation as an image in which the rear liquid crystal cell 3 and the front liquid crystal cell 2 are overlapped.

The display device 90 of an embodiment has a dual cell type liquid crystal display panel 1 in which a display image is generated by light passing through a rear liquid crystal cell and a front liquid crystal cell, and the dual cell image processing unit 12 described above.

The liquid crystal display panel 1 includes a backlight 5, a rear liquid crystal cell 3, a diffusion layer 4, and a front liquid crystal cell 2, which are arranged in this order.

In the present embodiment, it is possible to reduce the image quality deterioration caused by an increase in level of the rear image signal Sig_RE for such a liquid crystal display panel 1 of dual liquid crystal cell type.

Note that the technology disclosed in the present embodiment is not limited to the configurations and setting methods of the embodiments described above, and various modification examples of the configuration example of the dual cell image processing unit 12, the processing example of the filter control unit 15, and the like are conceivable.

Note that effects described in the present description are merely examples and are not limited, and other effects may be provided.

Note that the present technology can employ configurations as follows.

(1)
An image processing device including:
a gradation value conversion unit that performs a gradation value conversion on an input image signal, which is an image signal for a display panel in which a display image is generated by light passing through a rear liquid crystal cell and a front liquid crystal cell, so as to generate a rear image signal for the rear liquid crystal cell; and
a limit processing unit that performs a process of limiting a value of the rear image signal output from the gradation value conversion unit to a limit value.

(2)
The image processing device according to (1) above, further including
a maximum value detection unit that detects a maximum value of the input image signal,
in which the limit processing unit sets the limit value to a value based on the maximum value detected by the maximum value detection unit.

(3)
The image processing device according to (2) above, in which
the limit processing unit sets the maximum value detected by the maximum value detection unit as the limit value.

(4)
The image processing device according to (2) or (3) above, in which
the maximum value detection unit detects the maximum value for every area of a plurality of areas set in the image, and
the limit processing unit performs, for every area, a limit process with a limit value based on a maximum value in the area.

(5)
The image processing device according to any one of (2) to (4) above, further including
a lower limit processing unit that outputs, if the maximum value detected by the maximum value detection unit is less than a lower limit value that is set, the lower limit value as the maximum value.

(6)
The image processing device according to any one of (2) to (5) above, further including
a time filter unit that suppresses a variation amount in a time axis direction of the maximum value detected by the maximum value detection unit.

(7)
The image processing device according to (6) above, further including
a scene change detection unit that detects a scene change for the input image signal,
in which the time filter unit changes a filter operation if a scene change is detected.

(8)
The image processing device according to (6) or (7) above, further including:
a lower limit processing unit that sets, if the maximum value detected by the maximum value detection unit is less than a lower limit value that is set, the maximum value as the lower limit value; and
a moving image detection unit that detects whether or not the input image signal is a moving image,
in which the lower limit processing unit sets the lower limit value to a different value between when the input image signal is a moving image and when the input image signal is not a moving image.

(9)
The image processing device according to (4) above, further including
a spatial filter unit that suppresses a variation amount in a spatial direction of the maximum value in every area of a plurality of areas set in an image.

(10)
The image processing device according to any one of (1) to (9) above, in which
the gradation value conversion unit performs gamma conversion with a gamma value smaller than one.

(11)

The image processing device according to any one of (1) to (10) above, further including a spatial processing unit that performs on the rear image signal a spatial filter process to make a transmission pixel range of an image in the rear liquid crystal cell larger than that of an image in the front liquid crystal cell.

(12)

The image processing device according to any one of (1) to (11) above, further including a front image generation unit that performs a calculation process using the rear image signal on the input image signal to generate a front image signal for the front liquid crystal cell, in which the input image signal is a color image signal, the gradation value conversion unit performs gradation value conversion on a monochrome image signal converted from the color image signal, and the front image generation unit generates the front image signal by dividing the input image signal that is a color image signal by the rear image signal processed by the limit processing unit.

(13)

A display device including:

a display panel in which a display image is generated by light passing through a rear liquid crystal cell and a front liquid crystal cell;

a gradation value conversion unit that performs a gradation value conversion on an input image signal, which is an image signal for the display panel, so as to generate a rear image signal for the rear liquid crystal cell;

a limit processing unit that performs a process of limiting the value of the rear image signal output from the gradation value conversion unit to a predetermined limit value; and a front image generation unit that performs a calculation process using the rear image signal on the input image signal to generate a front image signal for the front liquid crystal cell.

(14)

An image processing method causing an image processing device to perform a procedure including:

a gradation value conversion procedure of performing a gradation value conversion on an input image signal, which is an image signal for a display panel in which a display image is generated by light passing through a rear liquid crystal cell and a front liquid crystal cell, so as to generate a rear image signal for the rear liquid crystal cell; and a limit processing procedure of performing a process of limiting a value of the rear image signal output through the gradation value conversion procedure to a predetermined limit value.

REFERENCE SIGNS LIST

1 Liquid crystal display panel
2 Front liquid crystal cell
3 Rear liquid crystal cell
4 Diffusion layer
5 Backlight
10 Image processing device
11 Display image processing unit
12 Dual cell image processing unit
20 Front liquid crystal cell drive unit
30 Rear liquid crystal cell drive unit
51 Rear image generation unit
52 Front image generation unit
53 Light intensity correction unit
54, 57 Panel gamma processing unit
55, 58 Adjustment unit
56 Rear output unit
57 Front output unit
70 Grayscale conversion unit
72 Gradation value conversion unit
73 LUT
74 Gamma conversion unit
79 Spatial processing unit
80 Limit processing unit
81 Area max value detection unit
82 Lower limit processing unit
83 Moving image detection unit
84 Time filter unit
85 Scene change detection unit
86 Spatial filter unit
90 Display device

The invention claimed is:

1. An image processing device, comprising:
circuitry configured to
perform a gradation value conversion on an input image signal, which is an image signal for a display panel in which a display image is generated by light passing through a rear liquid crystal cell and a front liquid crystal cell, so as to generate a rear image signal for the rear liquid crystal cell;
detect a maximum value of the input image signal:
set a limit value to a value based on the detected maximum value: and
perform a process of limiting a value of the rear image signal generated by the gradation value conversion to the limit value that is set based on the detected maximum value.

2. The image processing device according to claim 1, wherein the circuitry is further configured to set the detected maximum value as the limit value.

3. The image processing device according to claim 1, wherein the circuitry is further configured to detect a particular maximum value for each particular area of a plurality of areas set in an image corresponding to the input image signal, and
performs, for each particular area, a limit process with a particular limit value based on the particular maximum value in the particular area.

4. The image processing device according to claim 1, wherein the circuitry is further configured to output, when the detected maximum value is less than a set lower limit value, the lower limit value as the maximum value.

5. The image processing device according to claim 1, wherein the circuitry is further configured to suppress a variation amount in a time axis direction of the detected maximum value.

6. The image processing device according to claim 5, wherein the circuitry is further configured to:
detect a scene change for the input image signal, and
change a filter operation when a scene change is detected.

7. The image processing device according to claim 5, wherein the circuitry is further configured to:
set, when the detected maximum value is less than a set lower limit value, the maximum value as the lower limit value,
detect whether or not the input image signal is a moving image, and set the lower limit value to a different value depending on whether the input image signal is a moving image or is not a moving image.

8. The image processing device according to claim 3, wherein the circuitry is further configured to suppress a variation amount in a spatial direction of the particular maximum value in each particular area of the plurality of areas set in the image.

9. The image processing device according to claim 1, wherein the circuitry is configured to perform gamma conversion with a gamma value smaller than one.

10. The image processing device according to claim 1, wherein the circuitry is further configured to perform, on the rear image signal, a spatial filter process to make a transmission pixel range of an image in the rear liquid crystal cell larger than that of an image in the front liquid crystal cell.

11. The image processing device according to claim 1, wherein the circuitry is further configured to:
perform a calculation process using the rear image signal on the input image signal to generate a front image signal for the front liquid crystal cell, wherein the input image signal is a color image signal,
perform gradation value conversion on a monochrome image signal converted from the color image signal, and
generate the front image signal by dividing the input image signal that is a color image signal by the processed rear image signal.

12. A display device, comprising:
a display panel in which a display image is generated by light passing through a rear liquid crystal cell and a front liquid crystal cell; and
circuitry configured to
perform a gradation value conversion on an input image signal, which is an image signal for the display panel, so as to generate a rear image signal for the rear liquid crystal cell;
detect a maximum value of the input image signal;
set a limit value to a value based on the detected maximum value;
perform a process of limiting a value of the rear image signal generated by the gradation value conversion to the limit value that is set based on the detected maximum, and
perform a calculation process using the rear image signal on the input image signal to generate a front image signal for the front liquid crystal cell.

13. An image processing method, performed by an image processing device, the method comprising:
performing a gradation value conversion on an input image signal, which is an image signal for a display panel in which a display image is generated by light passing through a rear liquid crystal cell and a front liquid crystal cell, so as to generate a rear image signal for the rear liquid crystal cell;
detecting a maximum value of the input image signal;
setting a limit value to a value based on the detected maximum value; and
performing a process of limiting a value of the rear image signal generated by, the gradation value conversion to the limit value that is set based on the detected maximum value.

14. The image processing device of claim 1, wherein the circuitry is further configured to set, when the detected maximum value is less than a set lower limit value, the maximum value as the set lower limit value.

* * * * *